US011945522B2

(12) United States Patent
Matsumura et al.

(10) Patent No.: US 11,945,522 B2
(45) Date of Patent: Apr. 2, 2024

(54) VEHICLE-MOUNTED APPARATUS

(71) Applicant: Knorr-Bremse Commercial Vehicle Systems Japan Ltd., Saitama (JP)

(72) Inventors: Tatsuo Matsumura, Kawagoe (JP); Yukio Uchida, Higashimatsuyama (JP)

(73) Assignee: Knorr-Bremse Commercial Vehicle Systems Japan Ltd., Saitama (JP)

(*) Notice: Subject to any disclaimer, the term of this patent is extended or adjusted under 35 U.S.C. 154(b) by 635 days.

(21) Appl. No.: 16/982,634

(22) PCT Filed: Dec. 13, 2018

(86) PCT No.: PCT/JP2018/045788
§ 371 (c)(1),
(2) Date: Sep. 21, 2020

(87) PCT Pub. No.: WO2019/181105
PCT Pub. Date: Sep. 26, 2019

(65) Prior Publication Data
US 2021/0024126 A1    Jan. 28, 2021

(30) Foreign Application Priority Data

Mar. 22, 2018  (JP) ................................. 2018-054419

(51) Int. Cl.
*B62D 5/12*    (2006.01)
*B60R 16/023*    (2006.01)
(Continued)

(52) U.S. Cl.
CPC ............ *B62D 5/12* (2013.01); *B60R 16/0231* (2013.01); *B62D 5/064* (2013.01); *H02M 1/325* (2021.05);
(Continued)

(58) Field of Classification Search
CPC ..... B62D 6/00; H02P 2201/07; H02P 29/028; H02P 27/04; H02P 27/06; H02P 4/00; H02P 5/74; H02M 1/325
See application file for complete search history.

(56) References Cited

U.S. PATENT DOCUMENTS

| 7,857,081 B2 * | 12/2010 | Kishimoto | ............ B60W 10/08 |
| | | | 180/65.285 |
| 2012/0139337 A1 * | 6/2012 | Kim | ........................ B60L 53/11 |
| | | | 307/9.1 |

(Continued)

FOREIGN PATENT DOCUMENTS

| EP | 3875365 A2 * | 9/2021 | ............. B64C 25/10 |
| JP | 2005-125867 A | 5/2005 | |

(Continued)

OTHER PUBLICATIONS

International Search Report issued in corresponding application No. PCT/JP2018/045788 dated Feb. 26, 2019, with English translation.
(Continued)

*Primary Examiner* — Bickey Dhakal
(74) *Attorney, Agent, or Firm* — FOLEY & LARDNER LLP

(57) ABSTRACT

A vehicle-mounted apparatus includes: first and second voltage conversion circuits configured to convert voltages of electric powers supplied from first and second electric power supply circuits, to first and second predetermined voltages; first and second control circuits configured to be operated by the electric powers of the first and second predetermined voltages supplied from the first and second voltage conversion circuits, and to output first and second actuator command signals; first and second actuators configured to be actuated based on the first and second actuator command signals.

8 Claims, 16 Drawing Sheets

(51) Int. Cl.
    *B62D 5/06*           (2006.01)
    *H02M 1/32*         (2007.01)
    *H02P 5/74*          (2006.01)
    *H02P 27/04*        (2016.01)
    *H02P 29/028*      (2016.01)

(52) U.S. Cl.
    CPC ............... *H02P 5/74* (2013.01); *H02P 27/04* (2013.01); *H02P 29/028* (2013.01)

(56) References Cited

U.S. PATENT DOCUMENTS

| | | | | |
|---|---|---|---|---|
| 2015/0054444 A1* | 2/2015 | Tajima | ................. | G05B 19/406 |
| | | | | 318/565 |
| 2021/0188233 A1* | 6/2021 | Yuyama | ................. | B60T 8/885 |

FOREIGN PATENT DOCUMENTS

| | | | | | |
|---|---|---|---|---|---|
| JP | 2005125867 A | * | 5/2005 | | |
| JP | 2010161905 A | * | 7/2010 | .............. | B60L 1/003 |
| JP | 2015-160447 | | 9/2015 | | |
| JP | 2017-163776 A | | 9/2017 | | |
| WO | WO 2017/115411 A1 | | 7/2017 | | |
| WO | WO 2017/175325 A1 | | 10/2017 | | |
| WO | WO-2019039263 A1 | * | 2/2019 | ................ | B60L 3/00 |

OTHER PUBLICATIONS

Written Opinion issued in corresponding application No. PCT/JP2018/045788 dated Feb. 26, 2019, with English translation.

* cited by examiner

VEHICLE-MOUNTED APPARATUS

TECHNICAL FIELD

This invention relates to a vehicle-mounted device, and more specifically to an art to supply an electric power to a control circuit of the vehicle-mounted device.

BACKGROUND ART

A patent document 1 discloses a power steering device including an electric power steering and a hydraulic power steering.

PRIOR ART DOCUMENT

Patent Document

Patent Document 1: Japanese Patent Application Publication No. 2015-160447

SUMMARY OF THE INVENTION

Problems Which the Invention is Intended to Solve

For example, the above-described power steering device is set to be redundant to include a first control circuit configured to a first assist motor; and a second control circuit configured to control a second assist motor. In a case where this redundant system is applied to a plurality of vehicle types having different power source voltages, there is a problem that the control circuit is not operated in the normal state. It is necessary to form the control circuits for the respective power source voltages.

Means for Solving the Problem

It is an object of the present invention to provide a vehicle-mounted device configured to operate the redundant control circuits irrespective of the power source voltage.

According to one embodiment of the present invention, a vehicle-mounted apparatus comprises: a first voltage conversion circuit configured to convert a voltage of an electric power supplied from a first electric power supply circuit, to a first predetermined voltage; a first control circuit configured to be operated by the electric power of the first predetermined voltage supplied from the first voltage conversion circuit, and to output a first actuator command signal; a first actuator configured to be actuated based on the first actuator command signal; a second voltage conversion circuit configured to convert a voltage of an electric power supplied from a second electric power supply circuit, to a second predetermined voltage; a second control circuit configured to be operated by the electric power of the second predetermined voltage supplied from the second voltage conversion circuit, and to output a second actuator command signal; and a second actuator configured to be actuated based on the second actuator command signal.

By the one embodiment according to the present invention, the respective control circuits are configured to be operated by the electric power supplied from the voltage conversion circuits. Accordingly, even when the power source voltages are different from each other, the respective control circuits can operated.

DESCRIPTION OF EMBODIMENTS

Figure 1:
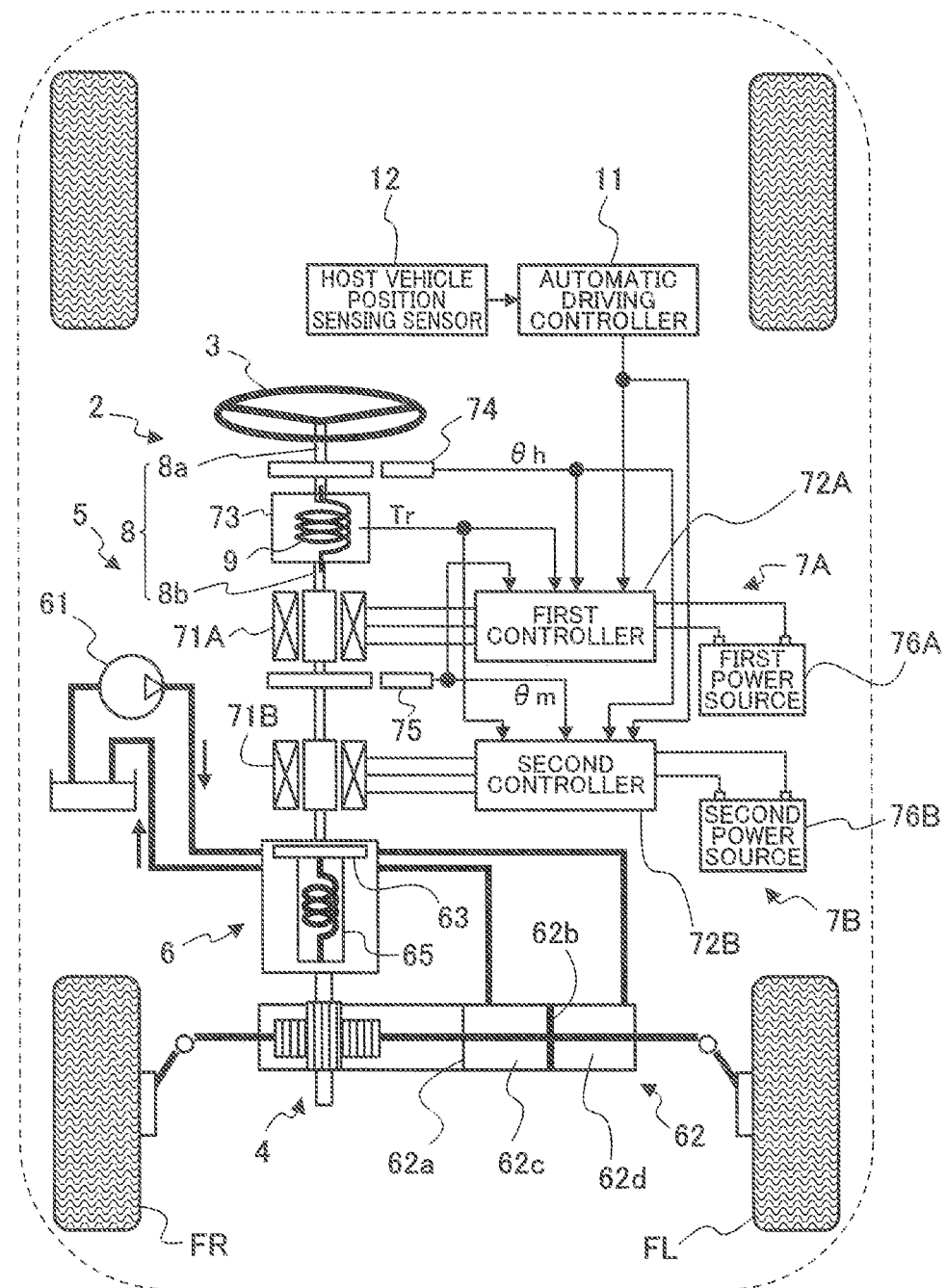
FIG. 1 is a system diagram of a power steering device of a vehicle.

Hereinafter, a vehicle-mounted device according to embodiments of the present invention are explained with reference to the drawings.

A power steering device 2 includes a steering mechanism 4 configured to transmit a steering operation of a steering wheel 3 to left and right front wheels FL and FR which are steered wheels; and a steering assist mechanism 5 configured to provide a steering assist force to the steering mechanism 4, and thereby to assist the steering operation.

Moreover, the steering assist mechanism 5 includes a hydraulic assist mechanism 6; and a first electric assist mechanism 7A and a second electric assist mechanism 7B which are a redundant system.

The hydraulic assist mechanism 6 is a mechanism configured to provide a steering assist force to the steering mechanism 4 based on a pressure of an oil (hydraulic fluid) pressurized and transmitted by a pump 61.

The hydraulic assist mechanism 6 includes a power cylinder 62 including a cylinder 62a and a piston 62b; and a rotary valve 63 configured to adjust the supply of the oil to first and second hydraulic chambers 62c and 62d which are a pair of hydraulic chambers of the power cylinder 62.

When the oil is supplied to the first hydraulic chamber 62c or the second hydraulic chamber 62d, the power cylinder 62 is configured to supply, as the steering assist force, a differential pressure between the hydraulic chambers 62c and 62d to the piston 62b which is a part of the steering mechanism 4.

When the steering wheel 3 is neutral, the rotary valve 63 is configured to discharge the oil discharged by the pump 61 to the reservoir tank 61 without supplying the oil to the first and second hydraulic chambers 62c and 62d.

On the other hand, when the driver steers (turns) the steering wheel 3, the rotary valve 63 is configured to selectively supply the oil to the first and second hydraulic chambers 62c and 62d in accordance with the torsion angle of the torsion bar 65.

That is, the rotary valve 63 is configured to switch a state where the oil is supplied to the first hydraulic chamber 62c, and the oil is discharged from the second hydraulic chamber 62d, and a state where the oil is supplied to the second hydraulic chamber 62d, and the oil is discharged from the first hydraulic chamber 62c, in accordance with the steering direction of the steering wheel 3.

Moreover, the rotary valve 63 is configured to increase the supply amount to the hydraulic chambers 62c and 62d, and the discharge amount of the oil from the hydraulic chambers 62c and 62d as the torsion angle of the torsion bar 65 is increased.

With this, the hydraulic assist mechanism 6 is configured to generate the pressure difference between the first and second hydraulic chambers 62c and 62d in accordance with the steering torque, and to provide the steering assist force to the steering mechanism 4.

The steering input shaft 8 includes a first input shaft 8a between the torsion bar 9 and the steering wheel 3; and a second input shaft 8b between the torsion bar 9 and the rotary valve 63. The first electric assist mechanism 7A and the second electric assist mechanism 7B are configured to provide the motor torque (the steering assist force) to the second input shaft 8b.

The first electric assist mechanism 7A and the second electric assist mechanism 7B are redundant mechanism so that the second electric assist mechanism 7B in the normal state can generate the steering force even when the first electric assist mechanism 7A is malfunctioned so as not to generate the steering force, and so that the first electric assist mechanism 7A in the normal state can generate the steering force even when the second electric assist mechanism 7B is malfunctioned so as not to generate the steering force.

Besides, the first electric assist mechanism 7A and the second electric assist mechanism 7B are also used to actuate the steering mechanism 4 in an automatic driving of the vehicle 1, in accordance with a command.

The first electric assist mechanism 7A includes a first hollow motor 71A which is a first actuator configured to generate the steering force; a first controller 72A which is a first control circuit configured to output a first actuator command signal to the first hollow motor 71A; and a first power source 76A which is a first electric power supply circuit configured to supply the electric power to the first controller 72A.

Moreover, the second electric assist mechanism 7B includes a second hollow motor 71B which is a second actuator configured to generate the steering force; a second controller 72B which is a second control circuit configured to output a second actuator command signal to the second hollow motor 71B; and a second power source 76B which is a second electric power supply circuit configured to supply the electric power to the second controller 72B.

The first hollow motor 71A and the second hollow motor 71B are three phase alternating current blushless motors configured to provide the motor torque directly to the second input shaft 8b.

Moreover, the first power source 76A and the second power source 76B are batteries mounted on the vehicle, and so on.

The first hollow motor 71A is configured to be actuated in accordance with the first actuator command signal outputted from the first controller 72A. The second hollow motor 71B is configured to be actuated in accordance with the second actuator command signal outputted from the second controller 72B.

Besides, the first electric assist mechanism 7A and the second electric assist mechanism 7B may be mechanisms configured to transmit the rotation driving force of the motor which is the actuator, through a transmitting mechanism to the second input shaft 8b.

Each of the first controller 72A and the second controller 72B includes a microcomputer including a CPU (Central Processing Unit), a ROM (Read Only Memory), a RAM (Random Access Memory), and so on.

Moreover, the first electric assist mechanism 7A and the second electric assist mechanism 7B includes a torque sensor 73 configured to sense a steering torque Tr inputted by the driver through the steering wheel 3 to the steering mechanism 4, in accordance with the torsion amount of the torsion bar 9; a first angle sensor 74 configured to sense a steering angle θh (a rotation angle of the first input shaft 8a) of the steering wheel 3; and a second angle sensor 75 configured to sense a rotation angle θm of the second input shaft 8b.

Besides, the rotation angle θm of the second input shaft 8b is identical to rotation angles of motor rotors of the first hollow motor 71A and the second hollow motor 71B. The second angle sensor 75 functions also as a motor rotation angle sensor configured to sense a motor rotation angle.

Moreover, the first angle sensor 74 is a sensor configured to sense a rotation angle of a gear configured to be interlocked and rotated with the first input shaft 8a.

The first controller 72A and the second controller 72B are configured to receive a detection signal of the steering torque Tr outputted from the torque sensor 73, a detection signal of the steering angle θh outputted from the first angle sensor 74, and a detection signal of the rotation angle θm outputted from the second angle sensor 75. Moreover, the first controller 72A and the second controller 72B are configured to receive an automatic drive request signal, a steering angle command signal, and so on from a host automatic drive controller 11. The first controller 72A and the second controller 72B are configured to output drive signals to the first hollow motor 71A and the second hollow motor 71B.

The automatic drive controller 11 includes a microcomputer including a CPU, a ROM, a RAM, and so on. The automatic drive controller 11 is configured to receive a host (own) vehicle position (outside information) from a host (own) vehicle position detection sensor 12 which is a vehicle-mounted camera (on-vehicle camera), and so on.

The automatic drive controller 11 is configured to calculate a command value of the steering angle in the automatic driving based on the host vehicle position information, and to output an automatic driving request indicative of whether or not there is the automatic driving request, and a steering angle command signal indicative of a target steering angle in the automatic driving, to the first controller 72A and the second controller 72B.

Figure 2:
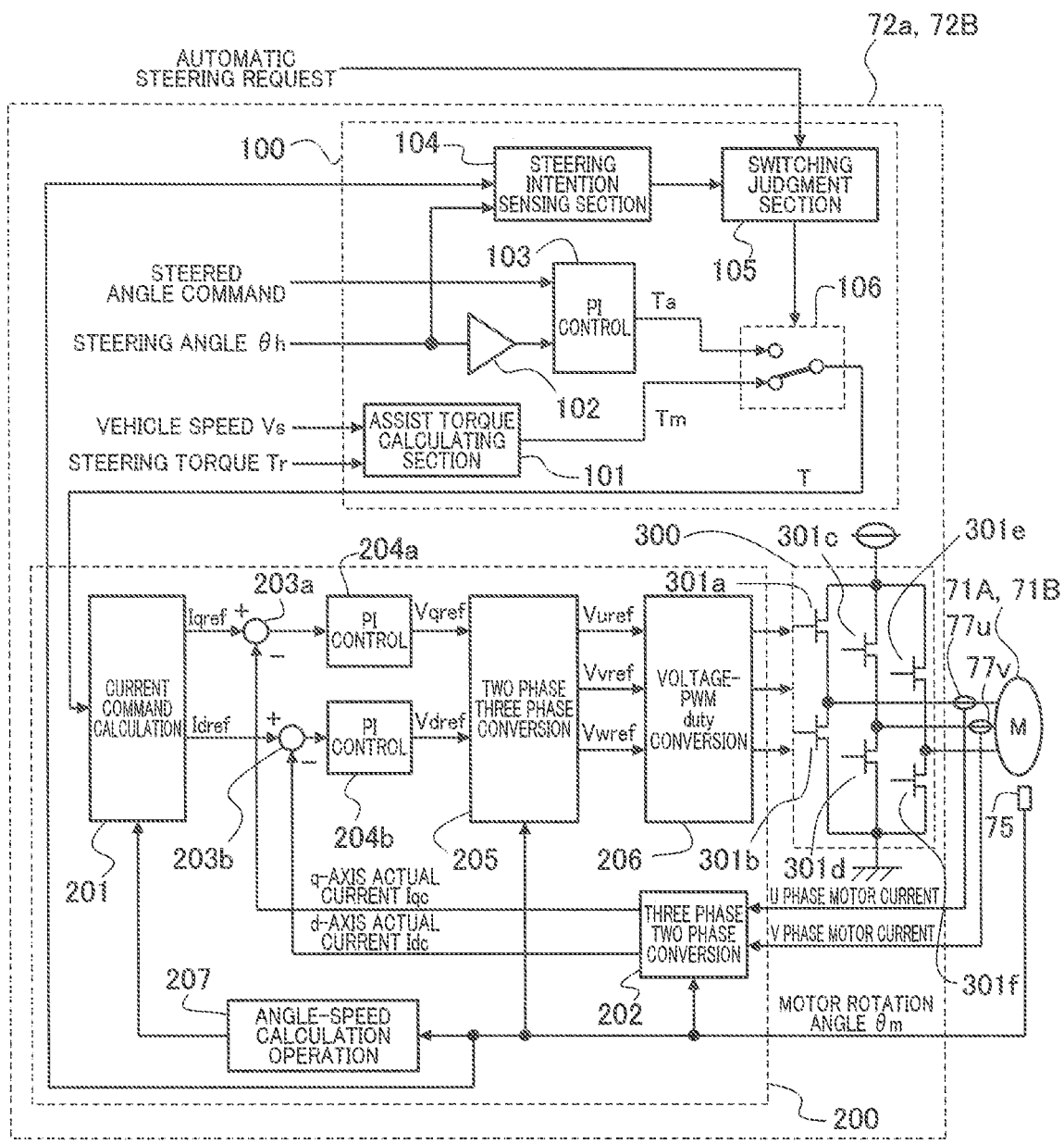
FIG. 2 is a functional block diagram of a controller of the power steering device.

FIG. 2 is a functional block diagram which is common to the first controller 72A and the second controller 72B.

The first controller 72A and the second controller 72B include an automatic drive control section 100 configured to switch the torque command value in accordance with the presence or absence of the automatic drive request; a motor control section 200 configured to produce the motor drive signal based on the torque command value; and a motor drive circuit 300 configured to control the energization of the hollow motors 71A and 71B based on the motor drive signal.

The automatic drive control section 100 is configured to receive the automatic drive request signal and the steering angle command signal from the automatic drive controller 11, the detection signal of the steering torque Tr outputted from the torque sensor 73, the detection signal of the steering angle θh outputted from the first angle sensor 74, the detection signal of the rotation angle θm outputted from the second angle sensor 75, and the detection signal of the vehicle speed Vs outputted from a vehicle speed sensor provided to a differential gear (not shown) and so on.

The automatic drive control section 100 includes an assist torque calculating section 101; a gear angle/steered (turning) angle conversion section 102; an automatic drive torque command calculating section 103; an override judging section (steering intention sensing section) 104; an automatic drive/normal control switching judgment section 105; and a command torque switching output section 106.

The assist torque calculating section 101 is configured to calculate the torque command value Tm according to the steering operation of the driver, based on the steering torque Tr and the vehicle speed Vs.

The gear angle/steered angle conversion section 102 is configured to convert the output of the first angle sensor 74 to the information of the steered angle. The automatic drive torque command calculating section 103 is configured to calculate the torque command value Ta of the electric assist mechanism 7A and 7B in the automatic drive, based on the information of the steering angle (the actual steering angle) obtained in the gear angle/the steered angle conversion section 102, and the steering angle command (the target steering angle) inputted from the automatic drive controller 11.

Moreover, the override judging section 104 is configured to judge the presence or the absence of the steering operation (the presence or the absence of the steering intention of the driver) during the automatic drive, based on the detection signal of the steering angle θh outputted from the first angle sensor 74, and the detection signal of the rotation angle θm outputted from the second angle sensor 75.

That is, when the automatic drive is performed, the rotation angle θm of the second input shaft 8b which is sensed by the second angle sensor 75 represents the steering angle in the automatic drive. On the other hand, when the rotation angle of the first input shaft 8a which is sensed by the first angle sensor 74 is different, the override judging section 104 is configured to judge that the driver operates the steering wheel 3 for correcting the steering angle in the automatic drive (the presence of the override operation).

The automatic drive/normal control switching judgment section 105 is configured to receive the automatic drive request signal from the automatic drive controller 11, and the signal indicative of the presence or the absence of the override operation from the override judging section 104.

The automatic drive/normal control switching judgment section 105 is configured to output the command to select the output of the automatic drive torque command calculating section 103 to the command torque switching output section 106 when there is no override operation by the driver in a state where the signal to request the automatic drive is inputted from the automatic drive controller 11.

Moreover, the automatic drive/normal control switching judgment section 105 is configured to output the command to select the output of the assist torque calculating section 101 to the command torque switching output section 106 when the override operation is performed by the driver in a state where the signal to request the automatic drive is inputted from the automatic drive controller 11.

Furthermore, the automatic drive/normal control switching judgment section 105 is configured to output the command to select the output of the assist torque calculating section 101 to the command torque switching output section 106 when there is no request of the automatic drive from the automatic drive controller 11.

The command torque switching output section 106 is configured to output, as the final torque command value T, one of the torque command value Tm calculated by the assist torque calculating section 101, and the torque command value Ta calculated by the automatic drive torque command calculating section 103, to the motor control section 200, in accordance with the selection command from the automatic drive/normal control switching judgment section 105.

The motor control section 200 includes a current command calculating section 201; a three phase two phase conversion device 202, deviation calculating sections 203a and 203b; PI control sections 204a and 204b; a two phase three phase conversion device 205; a voltage-duty conversion device 206; and an angle-speed calculation processing section 207.

The angle-speed calculation processing section 207 is configured to calculate the motor rotation speed N (rpm) based on the output of the second angle sensor 75.

The current command calculating section 201 is configured to calculate a d axis current command Idref and a q axis current command Iqref based on the torque command value T and the motor rotation speed N.

The first hollow motor 71A and the second hollow motor 71B are provided with a current sensor 77u configured to sense a current Iu flowing in a U phase of three phases of the U phase, a V phase, and a W phase, and a current sensor 77v configured to sense a current Iv flowing in the V phase of the three phases of the U phase, the V phase, and the W phase.

The three phase two phase conversion device 202 is configured to determine a d axis actual current Idc and a q axis actual current Iqc based on the U phase current Iu, the V phase current Iv, and the rotation angle θm.

The deviation calculating section 203a is configured to calculate a difference between the q axis current command Iqref and the q axis actual current Iqc. The deviation calculating section 203b is configured to calculate a difference between the d axis current command Idref and the d axis actual current Idc.

The PI control section 204a is configured to calculate a q axis voltage command Vqref necessary for the q axis actual Iqc following the q axis current command Iqref, by a PI control (proportion/integration control) based on the difference calculated by the deviation calculating section 203a.

The PI control section 204b is configured to calculate a d axis voltage command Vdref necessary for the d axis actual Idc following the d axis current command Idref, by a PI control (proportion/integration control) based on the difference calculated by the deviation calculating section 203b.

The two phase three phase conversion device 205 is configured to calculate a U phase voltage command Vuref, a V phase voltage command Vvref, and a W phase voltage command Vwref in the first hollow motor 71A and the second hollow motor 71B based on the d axis voltage command Vdref, the q axis voltage command Vqref, and the rotation angle θm.

The voltage-duty conversion device 206 is configured to determine the duty ratio in the PWM (Pulse Width Modulation) control, based on the U phase voltage command Vuref, the V phase voltage command Vvref, and the W phase voltage command Vwref, and to output a drive pulse signal of a pulse width according to the determined duty ratio, to the motor drive circuit 300.

The motor drive circuit 300 is an inverter circuit constituted by a three phase bridge connection of switching elements 301a-301f. Each of the switching elements 301a-301f is configured to be switched between the ON state and the OFF state in accordance with the drive pulse signal outputted by the voltage-duty conversion device 206.

With this, the motor control section 200 and the motor drive circuit 300 are configured to control the current flowing in the respective phases (the U phase, the V phase, and the W phase) of the first hollow motor 71A and the second hollow motor 71B, in accordance with the torque command value T.

Figure 3:
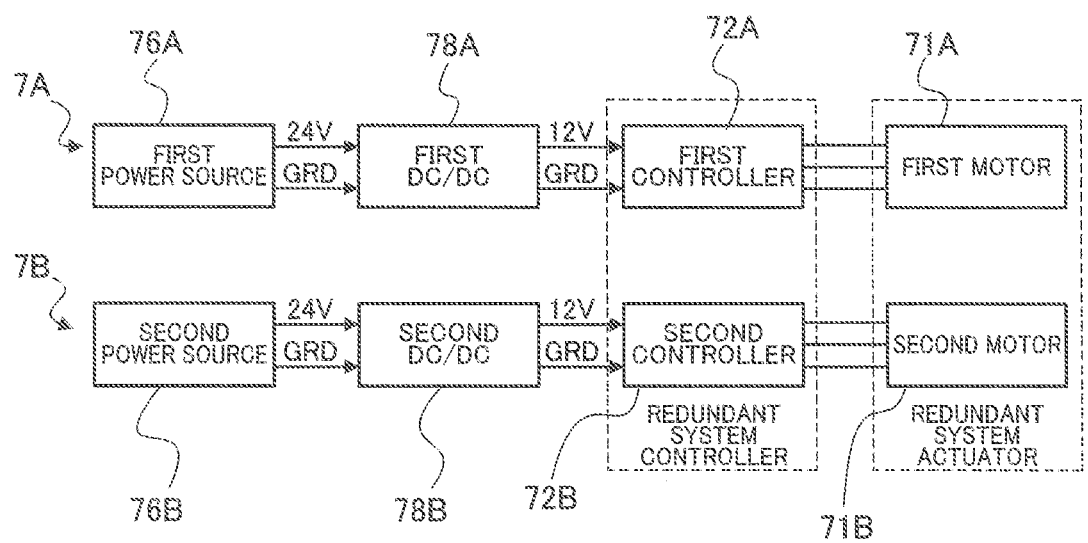
FIG. 3 is a view showing a redundant controller according to one embodiment.

FIG. 3 is a block diagram showing the power source circuits of the first electric assist mechanism 7A and the second electric assist mechanism 7B according to the one embodiment.

The first electric assist mechanism 7A and the second electric assist mechanism 7B are configured to receive the electric power supply, respectively, from the individual power sources 76A and 76B. The first electric assist mechanism 7A and the second electric assist mechanism 7B include, respectively, DC/DC converters 78A and 78B which are voltage control circuits disposed between the controllers 72A and 72b, and the power sources 76A and 76B that are batteries, and configured to convert the direct current voltage.

The first DC/DC converter 78A is a first voltage conversion circuit configured to convert the voltage of the electric power supplied from the power source 76A, to a first predetermined voltage. The first controller 72A is configured to be operated by the electric power of the first predetermined voltage supplied from the first DC/DC converter 78A.

The second DC/DC converter 78B is a second voltage conversion circuit configured to convert the voltage of the electric power supplied from the power source 76B, to a second predetermined voltage. The second controller 72B is configured to be operated by the electric power of the second predetermined voltage supplied from the second DC/DC converter 78B.

For example, in a case where the controllers 72A and 72B are operated by the power source voltage of 12V, and where the power sources 76A and 76B of the voltage of 12V, 24V, or 42V is used, a step-down converter configured to step down the voltage of the power sources 76A and 76B to 12V, and to supply this voltage to the controllers 72A and 72B is used as the DC/DC converters 78A and 78B.

In case of FIG. 3, the voltages of the power sources 76A and 76B are 24V. The DC/DC converters 78A and 78B are configured to produce the output voltage of 12V from 24V of the power sources 76A and 76B. With this, in the vehicle 1 including the power sources 76A and 76B of 24V, it is possible to use the controllers 72A and 72B of the rated power source voltage of 12V.

Besides, in the system of FIG. 3, the first electric assist mechanism 7A and the second electric assist mechanism 7B include, respectively, power sources 76A and 76B. On the other hand, in a system in which the electric power is supplied from a common power source (battery) to the controllers 72A and 72B, the controllers 72A and 72B can include, respectively, the DC/DC converters 78A and 78B. In this case, for example, in a case where the voltage of the common power source is 24V, the DC/DC converters 78A and 78B are configured to produce 12V from 24V, and to supply this voltage to the controllers 72A and 72B.

Moreover, the first predetermined voltage which is an operation voltage of the first controller 72A, and the second predetermined voltage which is an operation voltage of the second controller 72B may be the same operation voltage, and may be different operation voltages.

Figure 4:
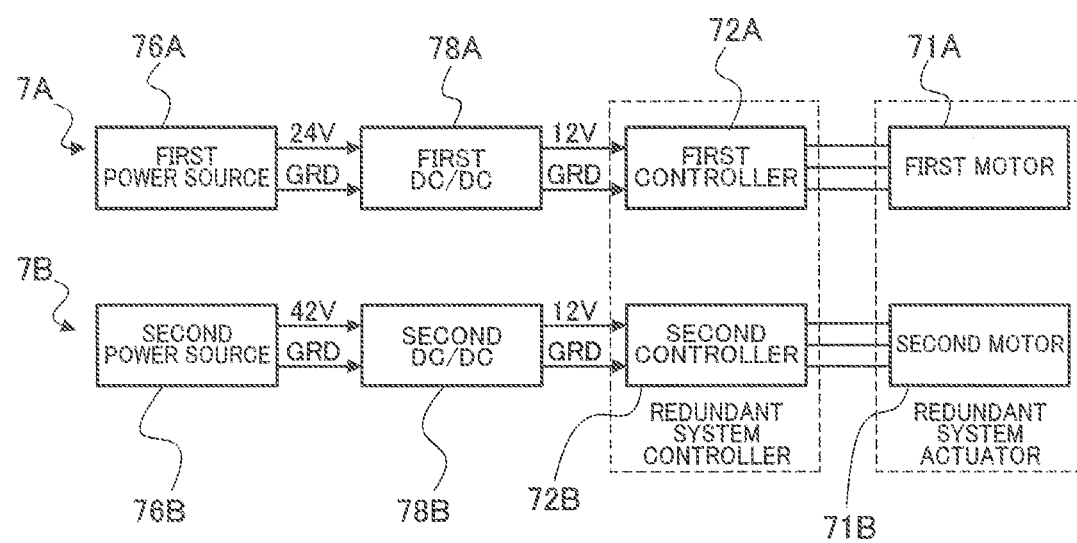
FIG. 4 is a view showing a redundant controller according to one embodiment.

Moreover, FIG. 4 shows a case where the voltage of the power source 76A is 24V, and the voltage of the power source 76B is 42V. The DC/DC converter 78A is configured to produce the output voltage of 12V from 24V of the power source 76A. The DC/DC converter 78B is configured to produce the output voltage of 12V from 42V of the power source 76B. With this, in the vehicle 1 including the power source 76A of 24V and the power source 76B of 42V, it is possible to use the controllers 72A and 72B of the rated power source voltage of 12V.

Figure 5:
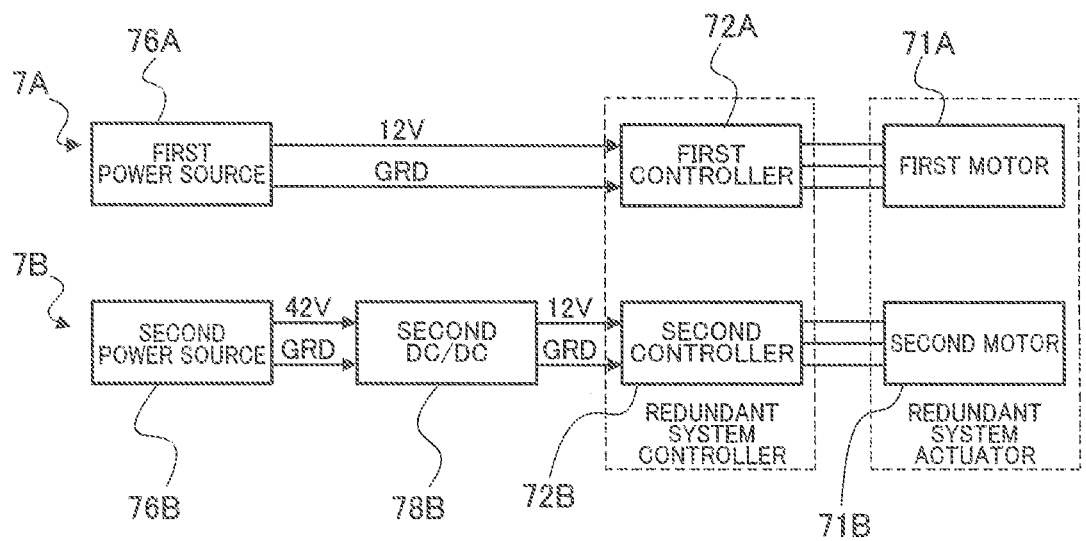
FIG. 5 is a view showing a redundant controller according to one embodiment.

Moreover, FIG. 5 shows a case where the voltage of the power source 76A is 12V, and the voltage of the power source 76B is 42V. The 12V power source is supplied from the power source 76A to the controller 72A without through the DC/DC converter. On the other hand, the second DC/DC converter 78B which is a step-down converter configured to produce 42V of the power source 76B to 12V is inserted between the power source 76B and the controller 72B. With this, in the vehicle 1 including the power source 76A of 12V and the power source 76B of 42V, it is possible to use the controllers 72A and 72B of the rated power source voltage of 12V.

In this way, even when the voltage of the power sources 76A and 76B is either of 12V, 24V, and 42V, the first electric assist mechanism 7A and the second electric assist mechanism 7B include the DC/DC converters 78A and 78B. With this, it is possible to commonly use the controllers 72A and 72B of the rated power source voltage of 12V.

That is, in a case where the first electric assist mechanism 7A and the second electric assist mechanism 7B do not include the DC/DC converters 78A and 78B, it is necessary to properly form the controllers 72A and 72B in accordance with the voltages of the power sources 76A and 76B.

Contrary to this, in a case where the first electric assist mechanism 7A and the second electric assist mechanism 7B include the DC/DC converters 78A and 78B, it is possible to use the common controllers 72A and 72B even when the voltages of the power sources 76A and 76B are different from each other. It is possible to increase the versatility of the controllers 72A and 72B, and to suppress the cost of the controllers 72A and 72B.

Moreover, the first electric assist mechanism 7A and the second electric assist mechanism 7B are configured to receive the power supply, respectively, from the individual DC/DC converters 78A and 78B. Accordingly, for example, even when the DC/DC converter 78A is malfunctioned, it is possible to continuously produce the steering force by the controller 72B to which the power is supplied from the DC/DC converter 78B.

Furthermore, even when the voltages of the power sources 76A and 76B are unstable, it is possible to stabilize the voltage supplied to the controllers 72A and 72B, by the DC/DC converters 78A and 78B. Accordingly, the operations of the controllers 72A and 72B are stabilized.

Figure 6:
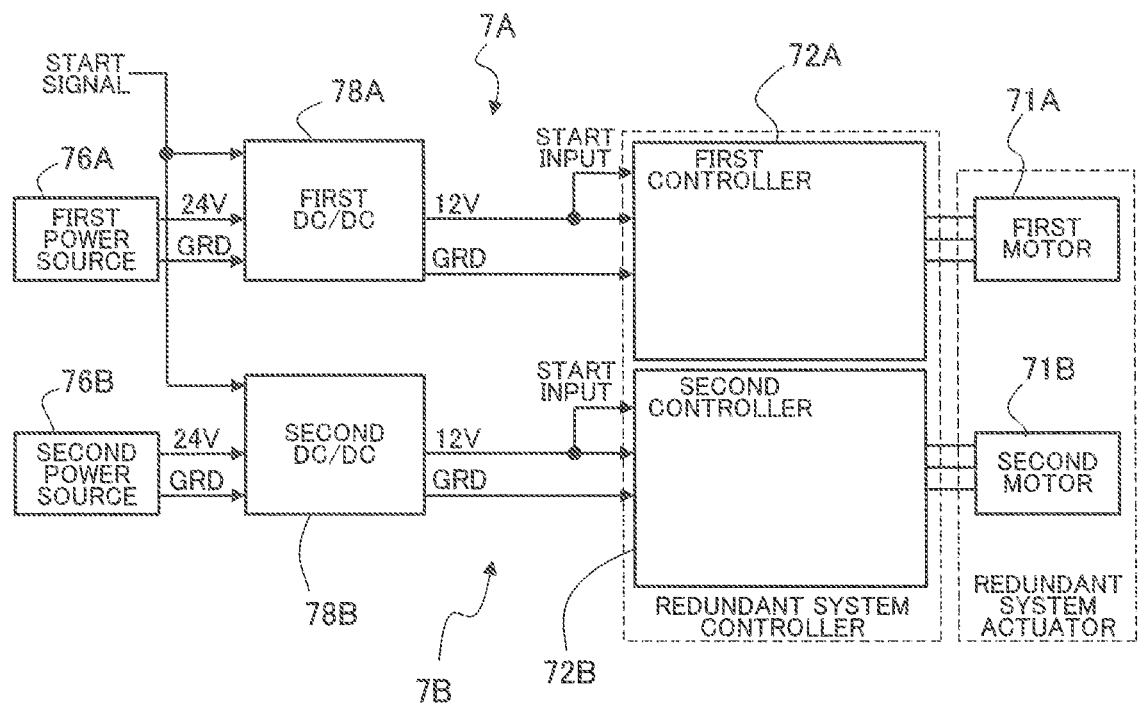
FIG. 6 is a view showing a redundant controller according to one embodiment.

FIG. 6 shows a system in which the DC/DC converters 78A and 78B are configured to be started or stopped in accordance with ON/OFF signal of the start switch 13 of the vehicle 1 (the start signal of the vehicle 1).

The DC/DC converters 78A and 78B of FIG. 6 are configure to obtain the ON/OFF signal of the start switch 13.

In this case, the start signal of the vehicle 1 may be, for example, an engine start signal of the ignition switch (including an accessory), and a start switch of a hybrid vehicle and an electric vehicle.

The DC/DC converters 78A and 78B are configured to be started to start the voltage conversion when the ON/OFF signal of the start switch 13 is switched from the OFF to the ON, and to be stopped to stop the voltage conversion when the ON/OFF signal of the start switch 13 is switched from the ON to the OFF.

In this system, the voltage conversions of the DC/DC converters 78A and 78B are stopped when the start switch 13 is in the OFF state (during the stop of the vehicle 1). Accordingly, it is possible to decrease the dark current.

Moreover, in the system of FIG. 6, the controllers 72A and 72B are configured to receive the output of the DC/DC converters 78A and 78B, as the power source supply and the ON/OFF signal of the start switch 13.

That is, when the start switch 13 is switched to the ON state so that the DC/DC converters 78A and 78B generate the output voltage of 12V, the controllers 72A and 72B are configured to be started by receiving the output of the DC/DC converters 78A and 78B as the ON signal (the start command) of the start switch 13.

On the other hand, when the start switch 13 is switched to the OFF state so that the DC/DC converters 78A and 78B stop the voltage conversion, the controllers 72A and 72B are configured to be stopped by receiving the output stop of the DC/DC converters 78A and 78B as the OFF signal (the stop command) of the start switch 13.

That is, the first DC/DC converter 78A is configured to output a first control circuit start signal to start the first controller 72A in accordance with the obtainment of the start signal of the vehicle 1. The second DC/DC converter 78B is configured to output a second control circuit start signal to start the second controller 72B in accordance with the obtainment of the start signal of the vehicle 1.

Besides, the signal of the start switch 13 outputted by the DC/DC converters 78A and 78B to the controllers 72A and 72B may be to start the electric power supply, and to transmit the reset signal.

In this system, even when the voltages of the power sources 76A and 76B are different from each other, the voltages of the signals received by the controllers 72A and 72B as the signal of the start switch 13 is 12V. Accordingly, the input circuits of the start switch signal in the controllers 72A and 72B are not needed to be varied in accordance with the voltages of the power sources 76A and 76B. Consequently, it is possible to further improve the communization of the controllers 72A and 72B.

That is, in a case where the controllers 72A and 72B directly use, as the start signal, the signal of the start switch 13 before the voltage adjustment by the DC/DC converters 78A and 78B, the controllers 72A and 72B may not be started in the normal state. However, it is possible to operate the controllers 72A and 72B in the normal state by using the electric power after the voltage adjustment as the start signal of the controllers 72A and 72B.

Besides, the input of the start switch signal in the controllers 72A and 72B may be omitted. In this case, it is possible to start and stop by the supply and the shut-off of the power source.

Figure 7:
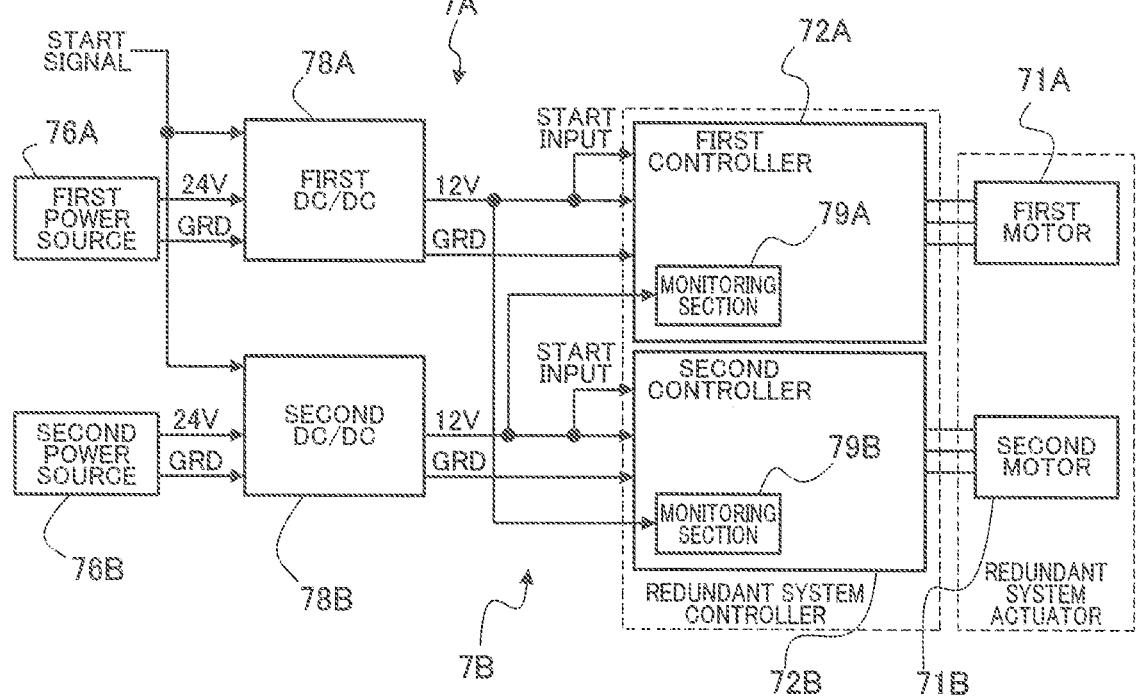
FIG. 7 is a view showing a redundant controller according to one embodiment.

FIG. 7 shows the first electric assist mechanism 7A including a first monitoring section 79A (second control circuit voltage monitoring section) configured to monitor the output voltage of the second DC/DC converter 78B of the second controller 72B, that is, the voltage of the electric power supplied to the second controller 72B; and the second electric assist mechanism 7B including a second monitoring section 79B (first control circuit voltage monitoring section) configured to monitor the output voltage of the first DC/DC converter 78A of the first controller 72A, that is, the voltage of the electric power supplied to the first controller 72A.

In this case, the first monitoring section 79A of the first controller 72A is configured to receive the output voltage of the second DC/DC converter 78B of the second controller 72B, and to judge whether or not the output voltage of the second DC/DC converter 78B is in the abnormal state. The second monitoring section 79B of the second controller 72B is configured to receive the output voltage of the first DC/DC converter 78A of the first controller 72A, and to judge whether or not the output voltage of the first DC/DC converter 78A is in the abnormal state.

Figure 8:
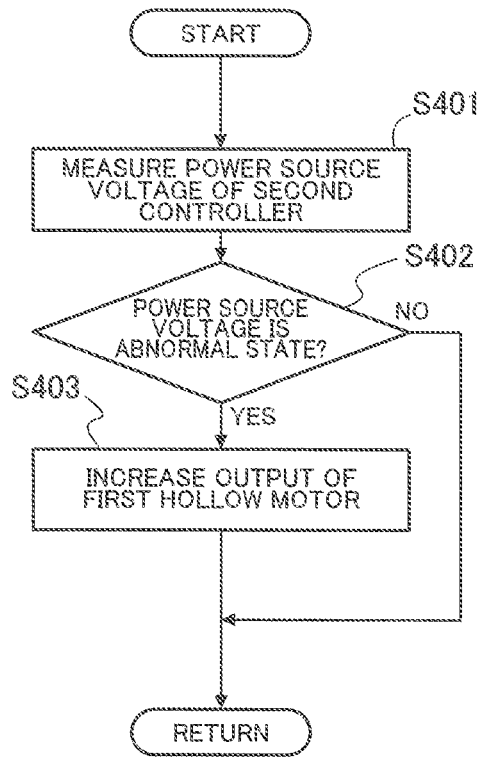
FIG. 8 is a flowchart showing a monitoring operation of a power source voltage which is applied to the system configuration of FIG. 7.

A flowchart of FIG. 8 shows a process of the monitoring operation of the output voltage of the second DC/DC converter 78B by the first controller 72A (the first monitoring section 79A) in the system shown in FIG. 7.

Besides, the second controller 72B (the second monitoring section 79B) is configured to monitor the output voltage of the first DC/DC converter 78A, similarly to the operation process by the first controller 72A shown in the flowchart of FIG. 8. Accordingly, detailed explanations of the monitoring process by the second controller 72B (the second monitoring section 79B) are omitted.

In the flowchart of FIG. 8, at step S401, the first controller 72A is configured to measure the output voltage of the second DC/DC converter 78B, and to obtain a measurement value MVB.

Next, at step S402, the first controller 72A is configured to judge whether or not the output voltage of the second DC/DC converter 78B is in the abnormal state by comparing the measurement value MVB obtained at step S401, and a judgment voltage THV.

The judgment voltage THV is a voltage defining a low voltage region in which the second hollow motor 71B cannot be driven in the normal state. The judgment voltage THV is, for example, substantially 9V when the output voltage of the second DC/DC converter 78B is 12V in the normal state.

The first controller 72A is configured to judge that the output voltage of the second DC/DC converter 78B is in the abnormal state (the abnormality of the second DC/DC converter 78B) when the measurement value MVB obtained at step S401 is smaller than the judgment voltage THV.

On the other hand, the first controller 72A is configured to judge that the output voltage of the second DC/DC converter 78B is in the normal state (the normality of the second DC/DC converter 78B) when the measurement value MVB obtained at step S401 is in the normal region which is equal to or greater than the judgment voltage THV.

When the first controller 72A judges the abnormality of the second DC/DC converter 78B at step S402, the process proceeds to step S403. The first controller 72A is configured to increase the torque of the first hollow motor 71A (the first actuator command value, and the output of the first controller 72A) controlled by the first controller 72A, and to compensate for the decreasing amount of the steering torque generated by the second electric assist mechanism 7B including the second DC/DC converter 78B.

Besides, when the second controller 72B judges the abnormality of the first DC/DC converter 78A, the second controller 72B is configured to increase the torque of the second hollow motor 71B (the second actuator command value), and to compensate for the decreasing amount of the steering torque generated by the first electric assist mechanism 7A including the first DC/DC converter 78A.

For example, when the second DC/DC converter 78B is malfunctioned in a state where the first electric assist mechanism 7A and the second electric assist mechanism 7B generate the identical steering force, the first controller 72A of the first electric assist mechanism 7A is configured to increase the generation torque of the first hollow motor 71A to suppress the decrease of the steering torque.

In this way, the controllers 72A and 72B include the monitoring sections 79A and 79B. With this, for example, the abnormality is generated in the supply voltage of the first controller 72A (the first DC/DC converter 78A). When the first controller 72A is not operated in the normal state, this abnormality is monitored by the second controller 72B. With this, the second controller 72B can handle the abnormality of the first controller 72A.

Figure 9:
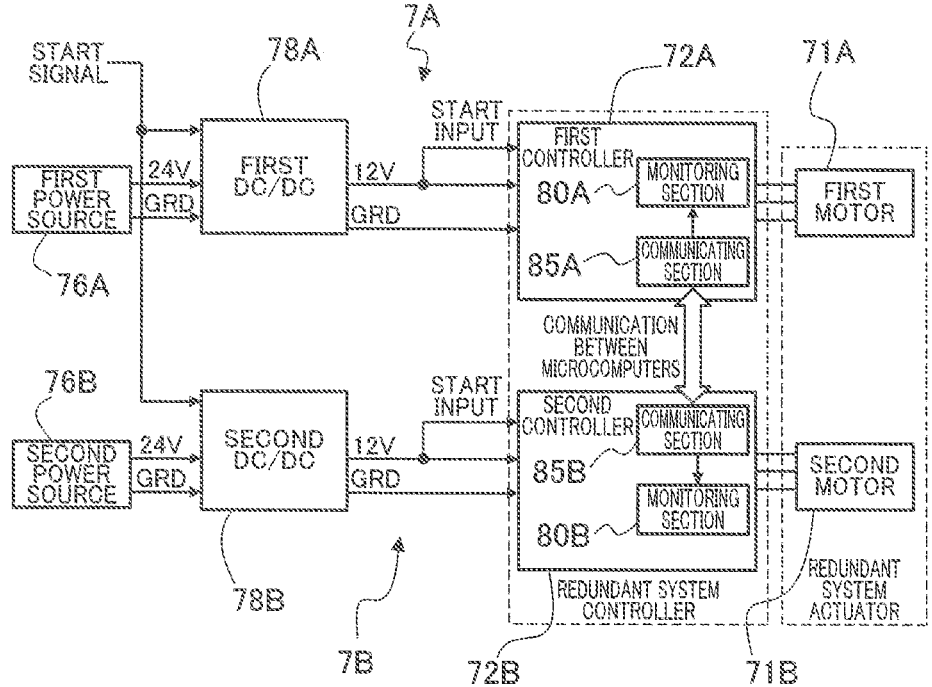
FIG. 9 is a view showing a redundant controller according to one embodiment.

In a system of FIG. 9, the controllers 72A and 72B are configured to measure the power source voltages supplied, respectively, to the controllers 72A and 72B. That is, the first controller 72A is configured to measure the output voltage of the first DC/DC converter 78A. The second controller 72B is configured to measure the output voltage of the second DC/DC converter 78B.

The controllers 72A and 72B are configured to mutually transmit and receive the information of the measured voltages by the communication between the controllers 72A and 72B (the inter-microcomputer communication).

The first controller 72A includes a first communication section (first inter-microcomputer communication section) 85A configured to be communicated with the second controller 72b. The second controller 72B includes a second communication section (second inter-microcomputer communication section) 85B configured to be communicated with the first controller 72A.

Moreover, the first controller 72A includes a first voltage monitoring section 80A (second control circuit voltage monitoring section) configured to monitor the measurement value MVB of the output voltage of the second DC/DC converter 78B which is transmitted from the second controller 72B. The second controller 72B includes a second voltage monitoring section 80B (second control circuit voltage monitoring section) configured to monitor the measurement value MVA of the output voltage of the DC/DC converter 78A which is transmitted from the second controller 72A.

The first voltage monitoring section 80A of the first controller 72A is configured to judge whether or not the measurement value MVB is the abnormal state, and to increase the torque of the first hollow motor 71A when the abnormality is judged. The second voltage monitoring section 80B of the second controller 72B is configured to judge whether or not the measurement value MVA is the abnormal state, and to increase the torque of the second hollow motor 71B when the abnormality is judged.

Figure 10:
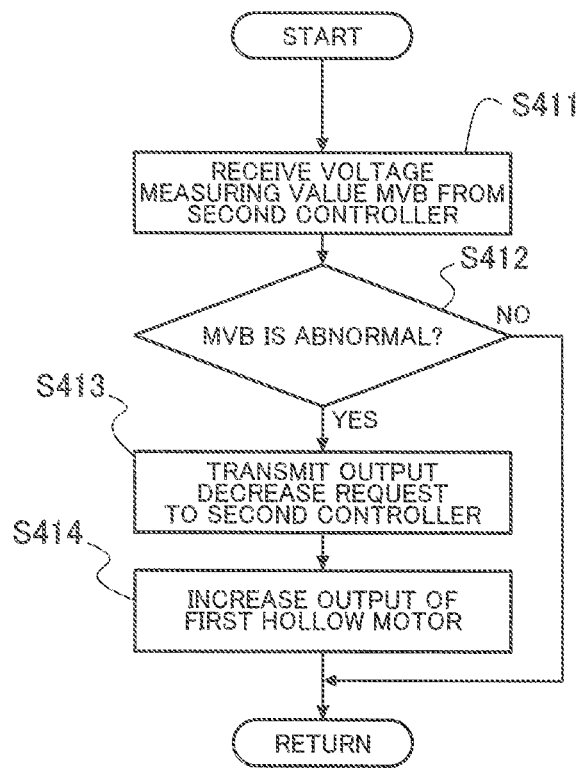
FIG. 10 is a flowchart showing a monitoring operation of a power source voltage which is applied to the system configuration of FIG. 9.

A flowchart of FIG. 10 shows a process of the monitoring operation of the output voltage of the second DC/DC converter 78B by the first controller 72A (the first voltage monitoring section 80A) in the system shown in FIG. 9.

Besides, the second controller 72B (the second voltage monitoring section 80B) performs the abnormality judgment operation of the output voltage of the first DC/DC converter 78A, similarly to the operation process by the first controller 72A shown in the flowchart of FIG. 10. Accordingly, detailed explanations of the monitoring operation by the second controller 72B (the second voltage monitoring section 80B) are omitted.

In the flowchart of FIG. 10, at step S411, the first controller 72A is configured to receive the information of the measurement value MVB from the second controller 72B.

Next, at step S412, the first controller 72A is configured to judge whether or not the output voltage of the second DC/DC converter 78B is in the abnormal state by comparing the measurement value MVB received at step S411 and the judgment voltage THV.

The judgment voltage THV is the voltage defining the low voltage region in which the second hollow motor 71B cannot be driven in the normal state, as explained at step S402. The judgment voltage THV is, for example, substantially 9V when the output voltage of the second DC/DC converter 78B is 12V in the normal state.

The first controller 72A is configured to judge that the output voltage of the second DC/DC converter 78B is in the abnormal state (the abnormality of the second DC/DC converter 78B) when the measurement value MVB obtained at step S411 is smaller than the judgment voltage THV. The process proceeds to step S413.

At step S413, the first controller 72A is configured to output a request to decrease the torque of the second hollow motor 71B, to the second controller 72B.

Besides, at step S413, the request which is to decrease the torque, and which is outputted by the first controller 72A to the second controller 72B includes a request to stop the driving of the second hollow motor 71B, and a request to generate the torque by the second hollow motor 71B to decrease the generation torque relative to the normal state.

When the first controller 72A judges that the output voltage of the second DC/DC converter 78B is in the abnormal state, the process proceeds to step S414. The first controller 72A is configured to increase the torque of the first hollow motor 71A to compensate for the decrease of the torque generated by the second hollow motor 71B.

Besides, when the second controller 72B judges that the abnormality of the output voltage of the first DC/DC converter 78A, the second controller 72B is configured to output the request to decrease the torque of the first hollow motor 71A, to the first controller 72A, and to increase the second hollow motor 71B.

In the system of FIG. 9, the redundant controllers 72A and 72B are configured to transmit and receive the information of the output voltages of the DC/DC converters 78A and 78B by the circuit communicated with each other. Accordingly, it is unnecessary to provide a new circuit (signal input and output port for monitoring the supply voltage) for the abnormality judgment of the output voltages of the DC/DC converters 78A and 78B. Therefore, it is possible to readily attain the abnormality judging operation.

Figure 11:
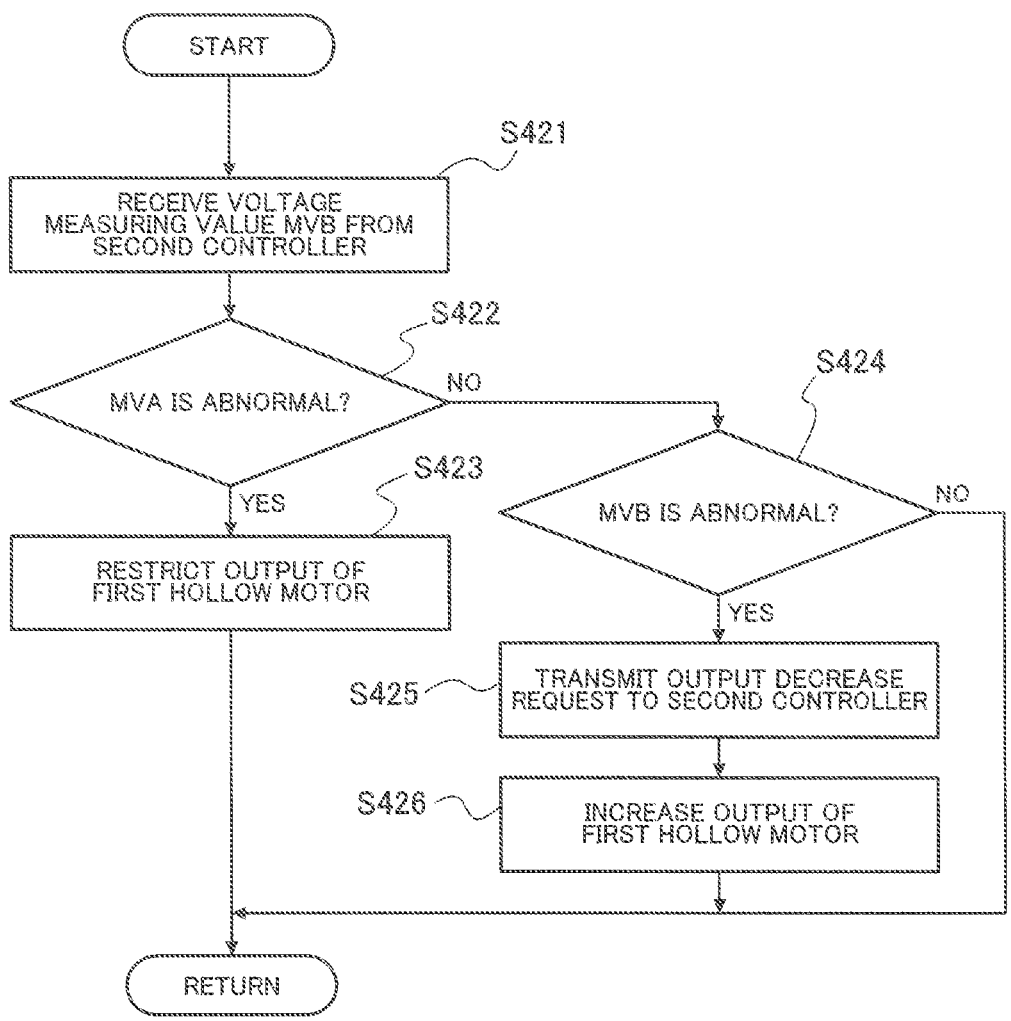
FIG. 11 is a flowchart showing a monitoring operation of a power source voltage which is applied to the system configuration of FIG. 9.

A flowchart of FIG. 11 shows the monitoring operation according to another embodiment by the first controller 72A (the first voltage monitoring section 80A), which is applied to the system configuration of FIG. 9.

Besides, the second controller 72B (the second voltage monitoring section 80B) is configured to perform the abnormality judgment operation of the output voltage of the first DC/DC converter 78A, similarly to the operation process by the first controller 72A shown in the flowchart of FIG. 11. Accordingly, detailed explanations of the abnormality judgment operation by the second controller 72B (the second voltage monitoring section 80B) are omitted.

In the flowchart of FIG. 11, at step S421, the first controller 72A is configured to receive the information of the measurement value MVB from the second controller 72B.

Next, at step S422, the first controller 72A is configured to judge whether or not the output voltage of the first converter DC/DC converter 78A is in the abnormal state by comparing the measurement value MVA of the output voltage of the first DC/DC converter 78A configured to supply the electric power to the first controller 72A, and the judgment voltage THV.

When the measurement MVA is smaller than the judgment voltage THV, the first controller 72A is configured to judge the abnormality of the output voltage of the first DC/DC converter 78A. The process proceeds to step S423.

At step S423, the first controller 72A is configured to restrict the torque of the first hollow motor 71A to be smaller than the torque when the output voltage of the first DC/DC converter 78A is in the normal state.

Moreover, the first controller 72A judges that the measurement value MVA is in the normal region which is equal to or greater than the judgment voltage THV, and judges that the first DC/DC converter 78A is in the normal state, the process proceeds to step S424.

At step S424, the first controller 72A is configured to judge whether or not the output voltage of the second DC/DC converter 78B is in the abnormal state by comparing the measurement voltage MVB received at step S421, and the judgment voltage THV.

When the measurement value MVB received at step S421 is smaller than the judgment voltage THV, the first controller 72A is configured to judge that the output voltage of the second DC/DC converter 78B is in the abnormal state (that is, the abnormality of the second DC/DC converter 78B). The process proceeds to step S425.

At step S425, the first controller 72A is configured to output the request to decrease the torque of the second hollow motor 71B, to the second controller 72B, similarly to step S413.

When the first controller 72A judges that the output voltage of the second DC/DC converter 78B is in the abnormal state, the process proceeds to step S426. The first controller 72A is configured to increase the torque of the first hollow motor 71A to compensate for the decrease of the torque generated by the second hollow motor 71B.

That is, when the output voltage of the second DC/DC converter 78B is smaller than the output voltage of the first DC/DC converter 78A, the first controller 72A is configured to output the torque command of the first hollow motor 71A (the first actuator command signal) which is higher than the torque command of the second hollow motor 71B (the second actuator command signal).

Besides, when the second controller 72B judges the abnormality of the output voltage of the second DC/DC converter 78B, the second controller 72B is configured to decrease the torque of the second hollow motor 71B. When the second controller 72B judges the abnormality of the output voltage of the first DC/DC converter 78A, the second controller 72B is configured to transmit a request to decrease the torque of the first hollow motor 71A, to the first controller 72A, and to increase the torque of the second hollow motor 71B.

By this monitoring operation, when the abnormality to decrease the output voltage is generated in one of the DC/DC converters 78A and 78B, it is possible to suppress the increase of the current flowing in one of the hollow motors 71A and 71B using, as the power source, the output voltage of the one of the DC/DC converters 78A and 78B in which the abnormality is generated. Moreover, it is possible to suppress the increase of the load of one of the controllers 72A and 72B which receives the electric power from the one of the DC/DC converters 78A and 78B in which the abnormality to decrease the output voltage is generated.

Figure 12:
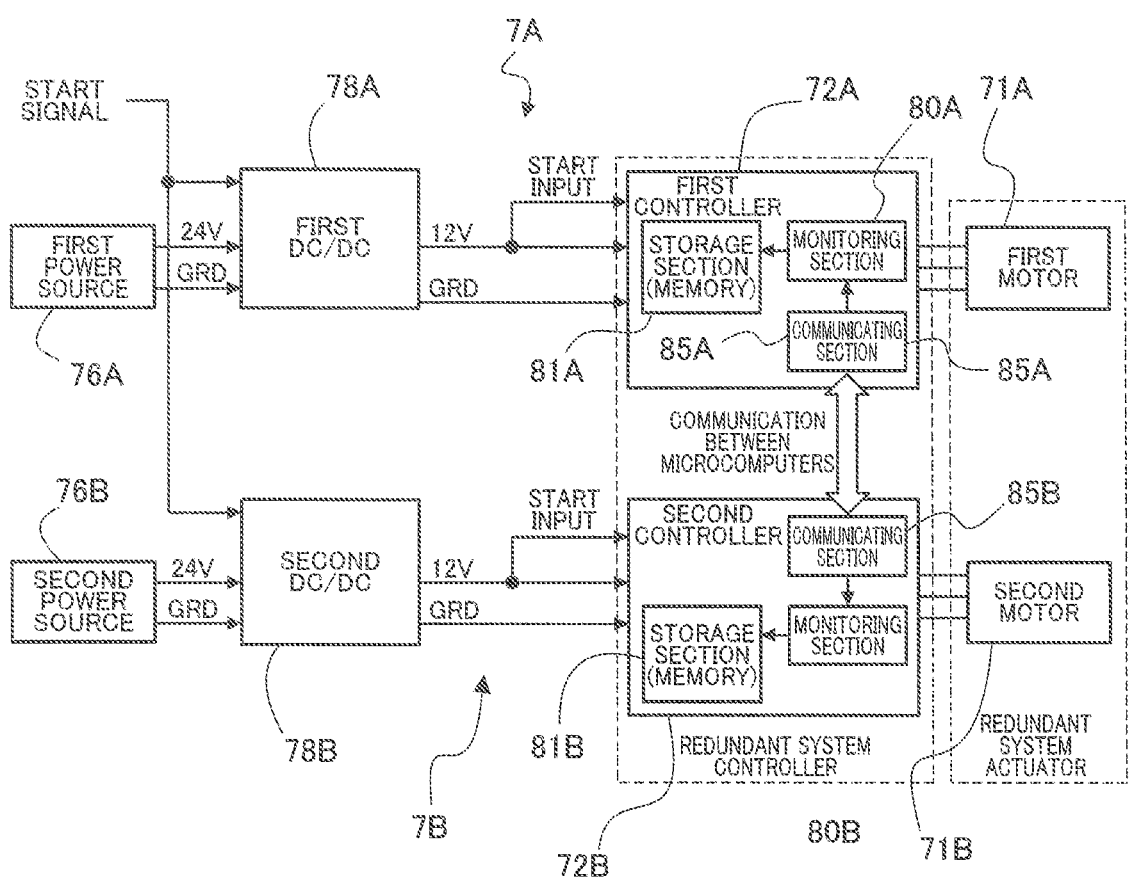
FIG. 12 is a view showing a redundant controller according to one embodiment.

In a system of FIG. 12, the first controller 72A further includes a first storing section 81A (first abnormality record storing section) configured to store a monitoring result by the first voltage monitoring section 80A, relative to the system of FIG. 9. The second controller 72B further includes a second storing section 81B (first abnormality record storing section) configured to store a monitoring result by the second voltage monitoring section 80B, relative to the system of FIG. 9.

Each of the storing sections 81A and 81B includes a nonvolatile memory such as an EEPROM (Electrically Erasable Programmable Read-Only Memory). The storing sections 81A and 81B are configured to store the information of the records (histories) of the monitoring results by the voltage monitoring sections 80A and 80B, in the nonvolatile memory.

Figure 13:
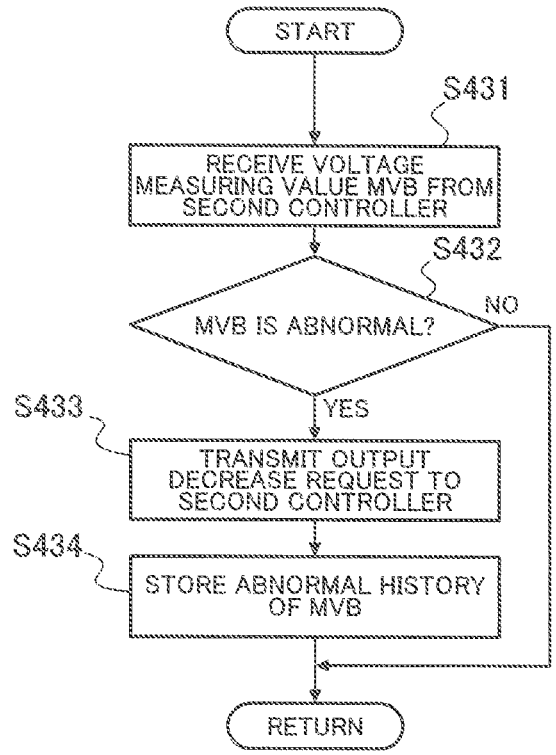
FIG. 13 is a flowchart showing a monitoring operation of a power source voltage which is applied to the system configuration of FIG. 12.

A flowchart of FIG. 13 shows the monitoring operation by the first voltage monitoring section 80A of the first controller 72A which is applied to the system configuration of FIG. 12. Moreover, the flowchart of FIG. 13 shows one example of the storing operation of the monitoring record by the first storing section 81A of the first controller 72A.

Besides, the second controller 72B (the second voltage monitoring section 80B and the second storing section 81B) is configured to monitor the output voltage of the first DC/DC converter 78A, and to store the monitoring result, similarly to the operation process by the first controller 72A shown in the flowchart of FIG. 13. Accordingly, detailed explanations of the monitoring operation and the record storing operation by the second controller 72B (the second voltage monitoring section 80B and the second storing section 81B) are omitted.

In the flowchart of FIG. 13, at step S431, the first controller 72A is configured to receive the information of the measurement value MVB from the second controller 72B.

Next, at step S432, the first controller 72A is configured to judge whether or not the output voltage of the second DC/DC converter 78B is in the abnormal state, by comparing the measurement value MVB received at step S431, and the judgment voltage THV.

As explained at step S402, the judgment voltage THV is a voltage defining a low voltage region in which the second hollow motor 71B cannot be driven in the normal state. The judgment voltage THV is, for example, substantially 9V when the output voltage of the second DC/DC converter 78B is 12V in the normal state.

The first controller 72A is configured to judge that the output voltage of the second DC/DC converter 78B is in the abnormal state (the abnormality of the second DC/DC converter 78B) when the measurement value MVB obtained at step S431 is smaller than the judgment voltage THV. The process proceeds to step S433 and the step S434.

At step S433, the first controller 72A is configured to output the request to decrease the torque of the second hollow motor 71B, to the second controller 72B, similarly to step S413.

Moreover, at step S434, the first controller 72A is configured to store the record of the judgment of the abnormality of the output voltage of the second DC/DC converter 78B (the record of the malfunction detection of the second DC/DC converter 78B), in the nonvolatile memory.

Besides, when the second controller 72B judges the abnormality of the output voltage of the first DC/DC converter 78A, the second controller 72B is configured to output the request to decrease the torque command value of the first hollow motor 71A, to the first controller 72A, and to store the record of the judgment of the abnormality of the output voltage of the first DC/DC converter 78A, in the installed nonvolatile memory.

In this case, for example, a maintenance worker for the vehicle can sense whether or not there is the malfunction record of the DC/DC converter 78B, based on the record of the storage of the nonvolatile memory.

Figure 14:
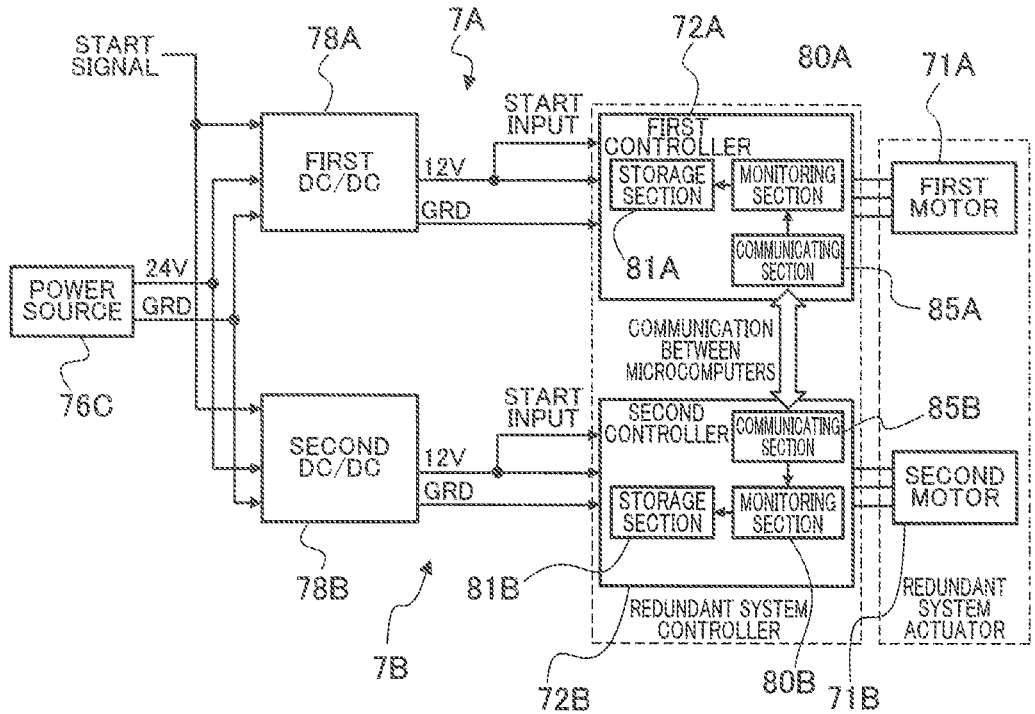
FIG. 14 is a view showing a redundant controller according to one embodiment.

The system of FIG. 14 includes a power source 76C (battery) as a common power source for the first electric assist mechanism 7A and the second electric assist mechanism 7B, in place of the power sources 76A and 76B of the system of FIG. 12.

Figure 15:
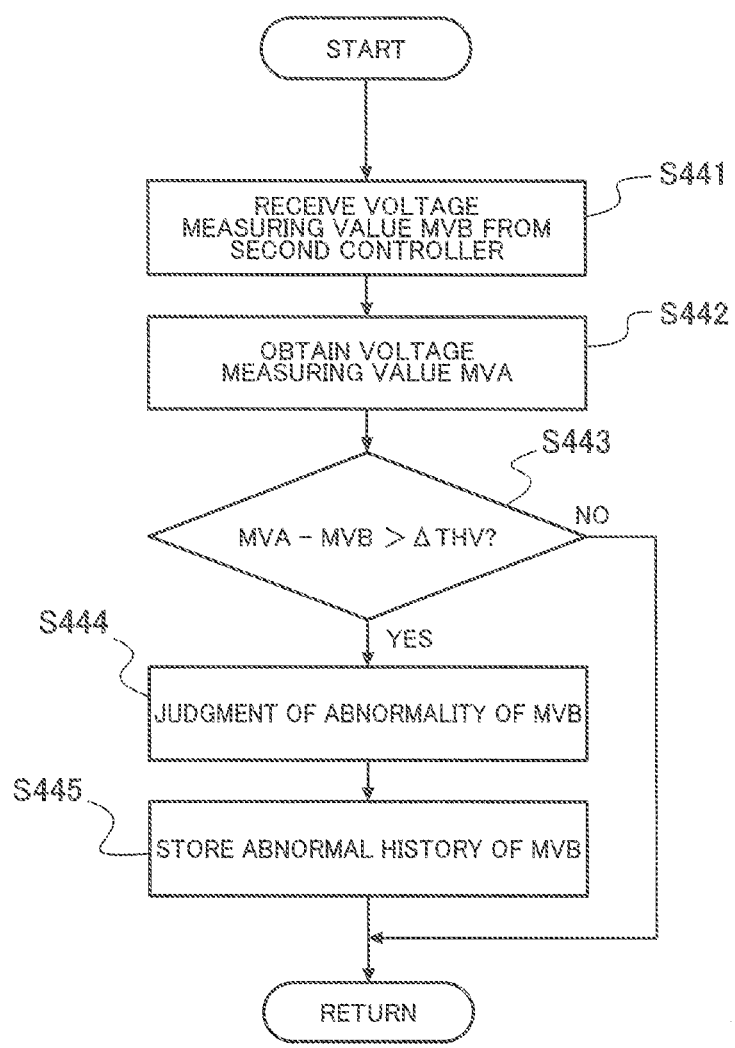
FIG. 15 is a flowchart showing a monitoring operation of a power source voltage which is applied to the system configuration of FIG. 14.

A flowchart of FIG. 15 shows one example of the monitoring operation by the first voltage monitoring section 80A of the first controller 72A, and the storing operation of the monitoring record by the first storing section 81A of the first controller 72A, which is applied to the system configuration of FIG. 14.

Besides, the second controller 72B (the second voltage monitoring section 80B and the second storing section 81B) is configured to judge whether or not the first DC/DC converter 78A is in the abnormal state, and to store the monitoring result, similarly to operation process by the first controller 72A shown in the flowchart of FIG. 15. Accordingly, detailed explanations of the monitoring operation and the record storing operation by the second controller 72B (the second voltage monitoring section 80B and the second storing section 81B) are omitted.

In the flowchart of FIG. 15, at step S441, the first controller 72A is configured to receive the information of the measurement value MVB from the second controller 72B.

Next, at step S442, the first controller 72A is configured to the measurement value MVA of the output voltage of the first DC/DC converter 78A.

At step S443, the first controller 72A is configured to judge whether or not the measurement MVB is smaller than the measurement value MVA.

That is, at step S443, the first controller 72A is configured to judge whether or not MVA−MVB>ΔTHV (ΔTHV>0) is satisfied.

In the system of FIG. 14, the first DC/DC converter 78A and the second DC/DC converter 78B are configured to adjust the voltage of the common power source 76C (the battery). Accordingly, the abnormality of the output voltage may not be generated in only one of the DC/DC converters 78A and 78B due to the voltage decrease of the power source 76C. Therefore, there is a high possibility that a state where the measurement value MVB is lower than the measurement value MVA is generated due to the abnormality of the second DC/DC converter 78B.

Accordingly, when the first controller 72A judges that the measurement value MVB is lower than the measurement value MVA at step S443, the first controller 72A is configured to judge that the output voltage of the second DC/DC converter 78B is in the abnormal state (that is, the abnormality of the second DC/DC converter 78B) at step S444.

Moreover, the first controller 72A is configured to store the record of the judgment of the abnormality of the output voltage of the second DC/DC converter 78B (the record of the malfunction detection of the second DC/DC converter 78B) in the nonvolatile memory.

Besides, when the second controller 72B senses the measurement value MVB−the measurement value MVA>ΔTHV, the second controller 72B is configured to store the record of the judgment of the abnormality of the output voltage of the first DC/DC converter 78A in the installed nonvolatile memory.

For example, the maintenance worker for the vehicle can sense whether or not there is the malfunction record of the DC/DC converter 78A and 78B, based on the record of the storage of the nonvolatile memory.

Figure 16:
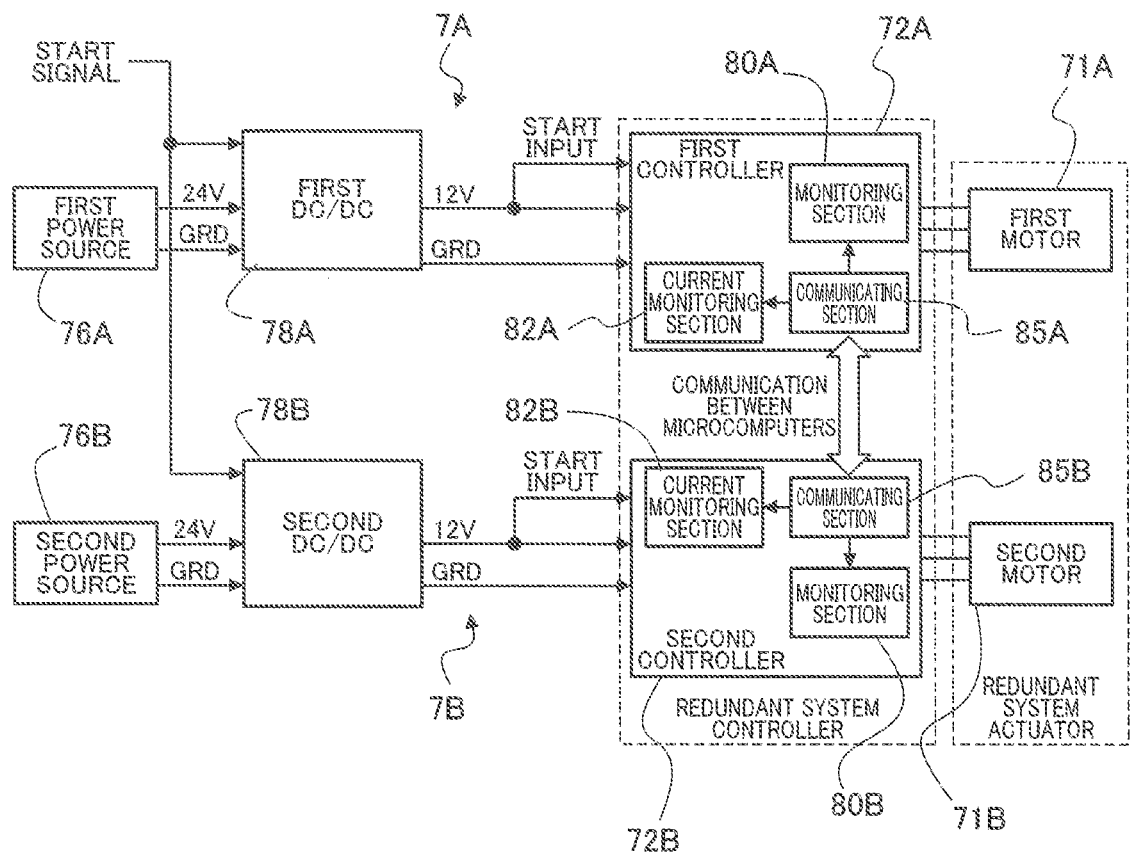
FIG. 16 is a view showing a redundant controller according to one embodiment.

In a system of FIG. 16, the controllers 72A and 72B include the voltage monitoring sections 80A and 80B configured to monitor the output voltage of the DC/DC converters 78A and 78B; and current monitoring sections 82A and 82B configured to monitor the current flowing in the hollow motors 71A and 71B.

In this case, the first voltage monitoring section 80A of the first controller 72A is configured to obtain and monitor the information of the output voltage of the second DC/DC converter 78B from the second controller 72B. The first current monitoring section 82A of the first controller 72A is configured to obtain and monitor the information of the current flowing in the second hollow motor 71B from the second controller 72B.

Moreover, the second voltage monitoring section 80B of the second controller 72B is configured to obtain and monitor the information of the output voltage of the first DC/DC converter 78A from the first controller 72A. The second current monitoring section 82B of the second controller 72B is configured to obtain and monitor the information of the current flowing in the first hollow motor 71A from the first controller 72A.

Then, the controllers 72A and 72B are configured to calculate the power consumptions (W) of the hollow motors 71A and 71B, and to compare the power consumptions (heating values, heating amounts) of the hollow motors 71A and 71B. The controllers 72A and 72B are configured to control the torque commands (the first actuator command signal and the second actuator command signal) of the hollow motors 71A and 71B controlled, respectively, by the controllers 72A and 72B.

Figure 17:
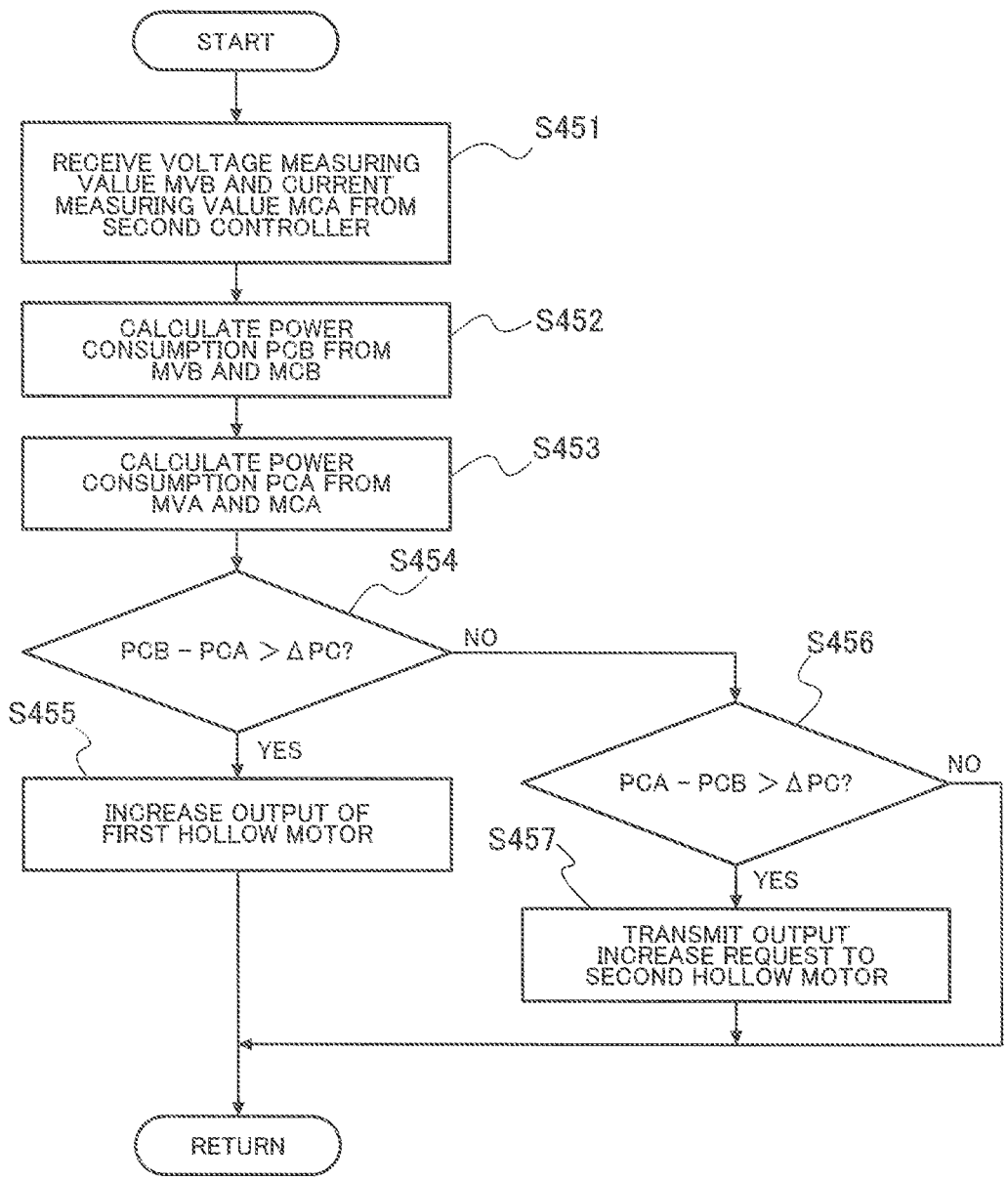
FIG. 17 is a flowchart showing a monitoring operation of a power source voltage which is applied to the system configuration of FIG. 16.

A flowchart of FIG. 17 shows a torque adjustment operation by the first controller 72A.

Besides, the second controller 72B is configured to control the torque, similarly to the adjustment operation process by the first controller 72A shown in the flowchart of FIG. 17. Accordingly, detailed explanations of the adjustment function by the second controller 72B are omitted.

In the flowchart of FIG. 17, at step S451, the first controller 72A is configured to receive the measurement value MVB of the output voltage of the second DC/DC converter 78B, and the measurement value MCB of the current flowing in the second hollow motor 71B, from the second controller 72B.

Next, at step S452, the first controller 72A is configured to calculate the power consumption PCB (W) of the second hollow motor 71B based on the measurement value MVB of the output voltage of the second DC/DC converter 78B, and the measurement value MCB of the current flowing in the second hollow motor 71B.

Moreover, at step S453, the first controller 72A is configured to measure the output voltage of the first converter DC/DC converter 78A (the power source voltage of the first hollow motor 71A), and to obtain the measurement value MVA. Moreover, the first controller 72A is configured to measure the current flowing in the first hollow motor 71A, and to obtain the measurement value MVA. The first controller 72A is configured to calculate the power consumption PCA (W) of the first hollow motor 71A based on the measurement value MVA and the measurement value MVA.

At step S454, the first controller 72A is configured to compare the power consumption PCA of the first hollow motor 71A and the power consumption PCB of the second hollow motor 71B.

In this case, when the power consumption PCB of the second hollow motor 71B is higher than the power consumption PCA of the first hollow motor 71A (when PCB−PCA>ΔPC (ΔPC>0) is satisfied), the first controller 72A is configured to correct and increase the torque of the first hollow motor 71A at step S455.

That is, when the power consumption PCB of the second hollow motor 71B is higher than the power consumption PCA of the first hollow motor 71A, and when it is presumed that the heating value in the inverter circuit of the second hollow motor 71B is greater than the heating value in the inverter circuit of the first hollow motor 71A, the first controller 72A is configured to correct and increase the torque of the first hollow motor 71A. With this, the torque required in the second hollow motor 71B is decreased to suppress the heating value in the inverter circuit of the second hollow motor 71B.

On the other hand, when the first controller 72A judges that the power consumption PCB of the second hollow motor 71B is not higher than the power consumption PCA of the first hollow motor 71A at step S454, the process proceeds to step S456.

At step S456, the first controller 72A is configured to judge whether or not the power consumption PCA of the first hollow motor 71A is higher than the power consumption PCB of the second hollow motor 71B (whether or not PCA−PCB>ΔPC (ΔPC>0) is satisfied).

In this case, when PCA−PCB>ΔPC (ΔPC>0) is satisfied, at step S457, the first controller 72A is configured to transmit the signal to request the increase of the torque of the second hollow motor 71B, to the second controller 72B. With this, the torque required in the first hollow motor 71A is decreased to suppress the heating value in the inverter circuit of the first hollow motor 71A.

Besides, when the power consumption PCA of the first hollow motor 71A is higher than the power consumption PCB of the second hollow motor 71B, and when it is presumed that the heating value in the inverter circuit of the first hollow motor 71A is greater than the heating value in the inverter circuit of the second hollow motor 71B, the second controller 72B is configured to correct and increase the torque of the second hollow motor 71B. With this, the torque required in the first hollow motor 71A is decreased to suppress the heating value in the inverter circuit of the first hollow motor 71A.

Moreover, when the power consumption PCB of the second hollow motor 71B is higher than the power consumption PCA of the first hollow motor 71A, and when it is presumed that the heating value in the inverter circuit of the second hollow motor 71B is greater than the heating value in the inverter circuit of the first hollow motor 71A, the second controller 72B is configured transmit a signal to request for the increase of the torque of the first hollow motor 71A, to the first controller 72A. With this, the torque required in the second hollow motor 71B is decreased to suppress the heating value in the inverter circuit of the second hollow motor 71B.

With this, the controllers 72A and 72B suppress the excessive heating (the problem of the power consumption) of one of the inverter circuits of the first hollow motor 71A and the inverter circuit of the second hollow motor 71B, and suppress the damage and the performance reduction of the circuit due to the heating.

Figure 18:
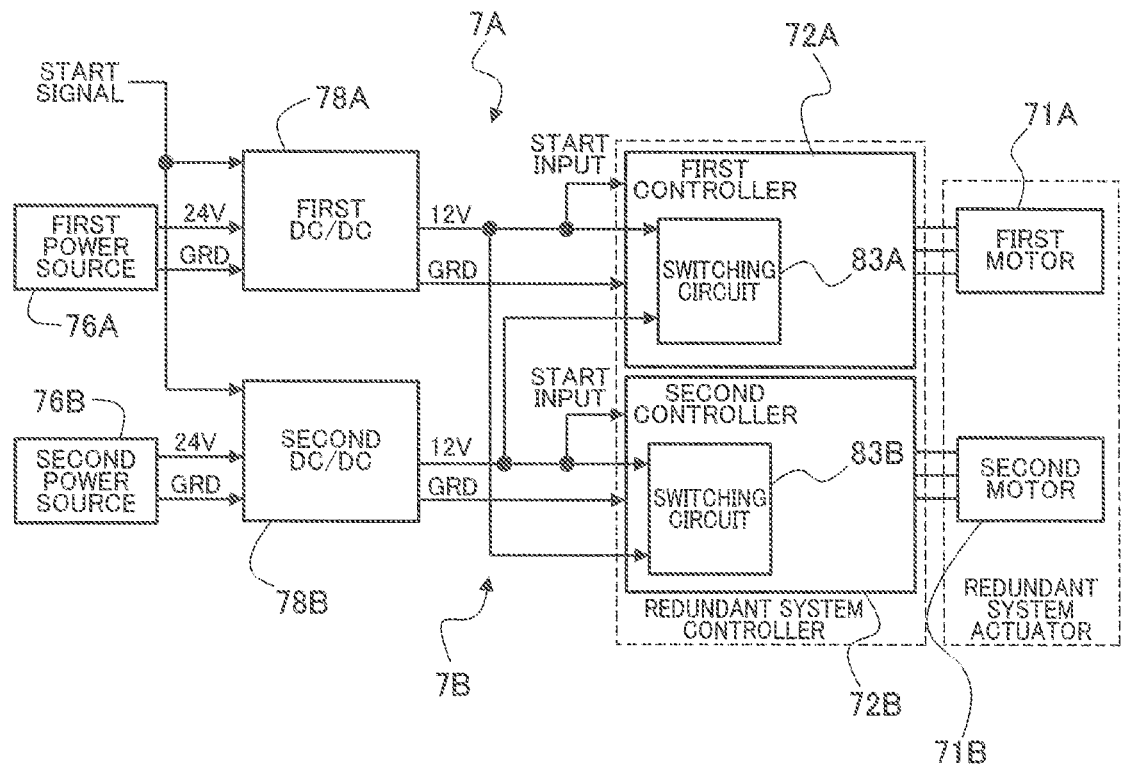
FIG. 18 is a view showing a redundant controller according to one embodiment.

In a system of FIG. 18, the controllers 72A and 72B include, respectively, power source switching circuits 83A and 83B configured to receive the power source supply by selecting one of a first power source system including the first power source 76A and the first DC/DC converter 78A, and a second power source system including the second power source 76B and the second DC/DC converter 78B.

That is, in the system of FIG. 18, the first controller 72A can obtain the electric power supplied from the second DC/DC converter 78B. The second controller 72B can obtain the electric power supplied from the first DC/DC converter 78A.

The power source supply switching circuits 83A and 83B are circuits by which, when the abnormality of the output voltage is generated in one of the DC/DC converters 78A and 78B, the controllers 72A and 72B receive the power source supply from the DC/DC converters 78A and 78B having the output voltage in the normal state.

Figure 19:
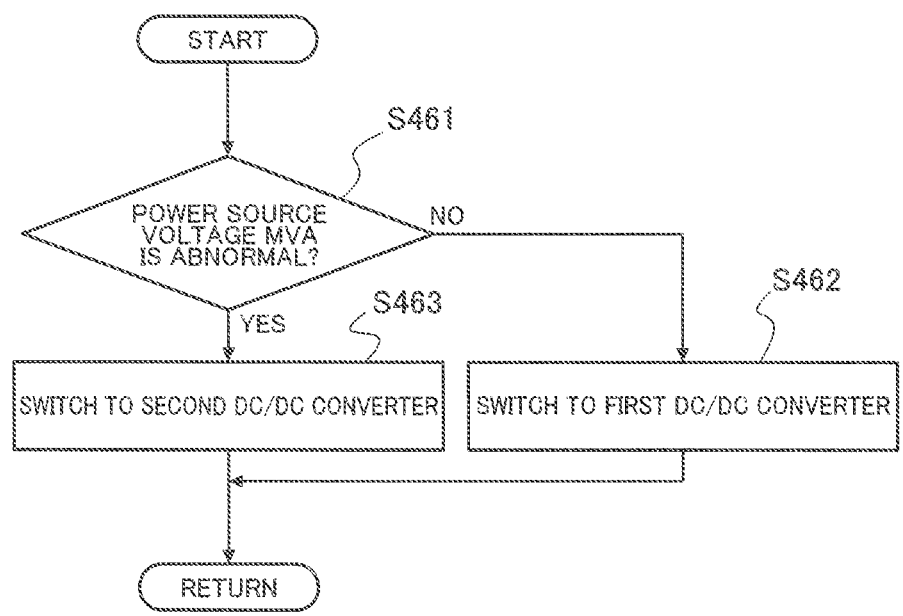
FIG. 19 is a flowchart showing a power source switching operation which is applied to the system configuration of FIG. 16.

A flowchart of FIG. 19 shows one example of the operation for switching the power sources by the first power source switching circuit 83B of the first controller 72A.

Besides, the second power source switching circuit 83B of the second controller 72B is configured to switch the power sources, similarly to the process by the first controller 72A shown in the flowchart of FIG. 19. Accordingly, detailed explanations are omitted.

In the flowchart of FIG. 19, at step S461, the first controller 72A is configured to judge whether the output voltage of the first DC/DC converter 78A is in the normal state or the abnormal state by comparing the measurement value MVA and the judgement voltage THV.

In this case, when the measurement value MVA of the output voltage of the first DC/DC converter 78A is in the normal region, the first controller 72A is configured to control to supply, as the power source, the output voltage of the first DC/DC converter 78A to the first controller 72A at step S462.

On the other hand, when the measurement value MVA of the output voltage of the first DC/DC converter 78A is in the abnormal state, the first controller 72A is configured to control to supply, as the power source, the output voltage of the second DC/DC converter 78B as the power source to the first controller 72A.

Besides, when the output voltage of the second DC/DC converter 78B is in the normal region, the second controller 72B is configured to control to receive the power source supply from the second DC/DC converter 78B. When the output voltage of the second DC/DC converter 78B is in the abnormal state, the second controller 72B is configured to control to receive the power source supply from the first DC/DC converter 78A.

Accordingly, in the system of FIG. 18, when the output voltage of the first DC/DC converter 78A is in the abnormal state, the output voltage of the second DC/DC converter 78B is supplied as the power source to the both controllers 72A and 72B. When the output voltage of the second DC/DC converter 78B is in the abnormal state, the output voltage of the first DC/DC converter 78A is supplied as the power source to the both controllers 72A and 72B.

With this, even when the abnormality of the output voltage is generated in one of the first DC/DC converter 78A and the second DC/DC converter 78B, it is possible to continuously supply the power source to the both controllers 72A and 72B, and to expand the operation range at the malfunction.

On the other hand, as the countermeasures against the heating generation of the DC/DC converters 78A and 78B, the DC/DC converters 78A and 78B can be mounted to a cylinder housing of the power cylinder 62 of the hydraulic assist mechanism 6 so that the heating of the DC/DC converters 78A and 78B is transmitted to the cylinder housing.

Figure 20:
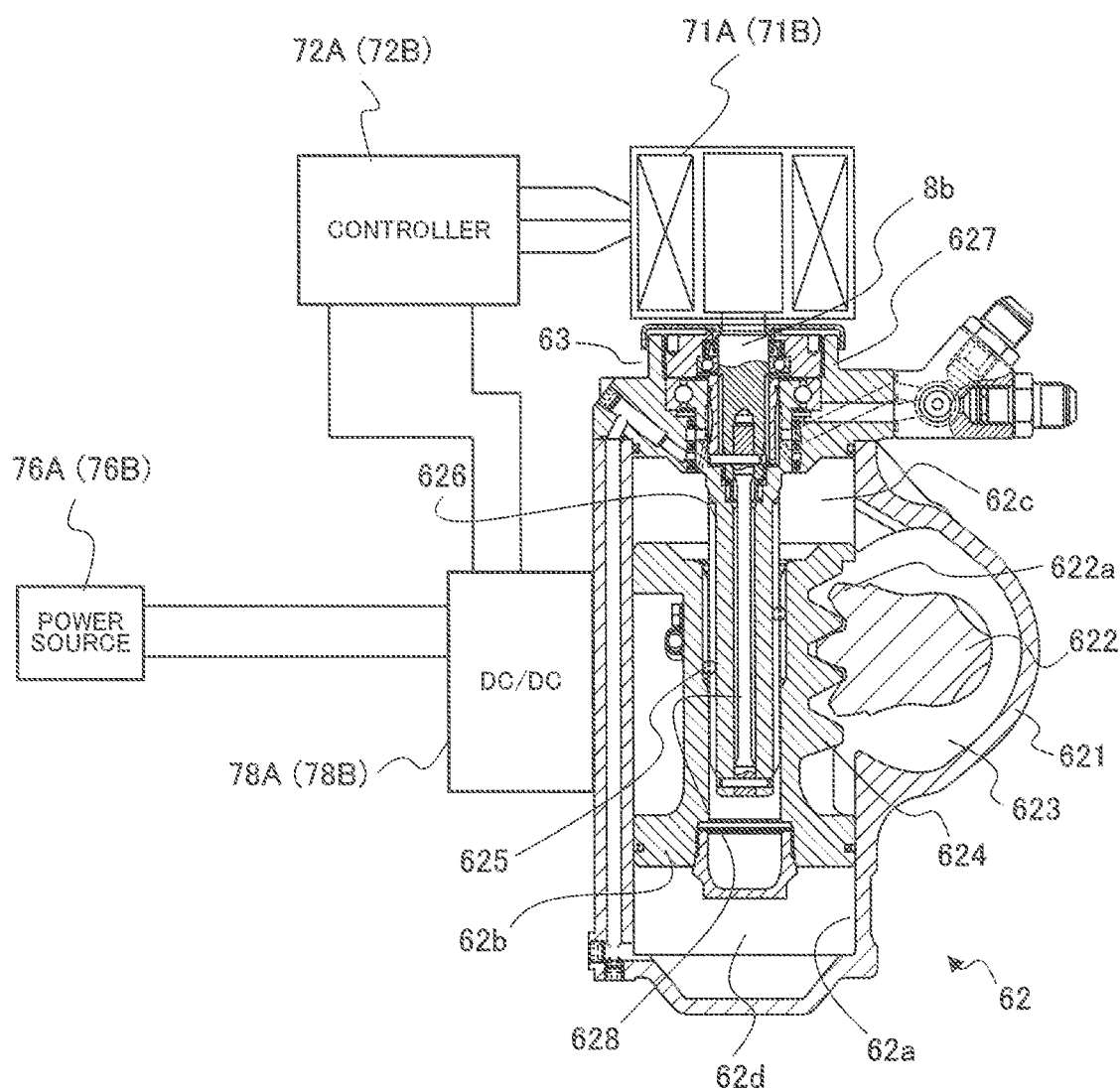
FIG. 20 is a view showing a mounting position of a DC\DC converter.

FIG. 20 is a sectional view showing one example of a structure of the power cylinder 62.

The power cylinder 62 includes a cylinder housing 621 made from a metal. The cylinder housing 621 includes a cylinder 62a positioned inside the cylinder housing 621.

The cylinder 62a receives a piston 62b configured to be reciprocated. The piston 62b separate first and second hydraulic chambers 62c and 62d within the cylinder 62a.

The cylinder 62a includes a sector shaft chamber 623 which is positioned on a side of the cylinder 62a, and which receives a sector shaft 622 connected to a pitman arm (not shown).

The piston 62b has a substantially cylindrical shape. The piston 62b includes a rack portion 624 formed on an outer circumference of the piston 62b at a positon to confront the sector shaft 622.

The rack portion 624 of the piston 62b is engaged with a teeth portion 622a of the sector shaft 622. A combination of the rack portion 624 of the piston 62b and the teeth portion 622a of the sector shaft 622 constitutes a conversion mechanism configured to convert the reciprocating movement of the piston 62b to a rotation motion of the sector shaft 622.

The steering wheel is provided with the steering angle by the rotation of the sector shaft 622.

Moreover, the piston 62b is connected through a ball screw mechanism 625 to an axial end portion of a substantially cylindrical output shaft 626. When the output shaft 626 is rotated, the piston 62b is reciprocated.

That is, in the steering mechanism 4, when the output shaft 626 is rotated, the piston 62b is reciprocated. The sector shaft 622 is rotated by the reciprocating movement of the piston 62b. The steering wheel is provided with the steering angle by the rotation of the sector shaft 622.

The cylinder housing 621 includes a valve housing 627 which is located at a base end of the cylinder housing 621, and which receives the rotary valve 63. The second input shaft 8b is inserted within the valve housing 627 so that an axis of the second input shaft 8b is aligned with an axis of the output shaft 626.

The second input shaft 8b and the output shaft 626 are connected through the torsion bar 628.

The rotary valve 63 is configured to be opened in accordance with the torsion amount of the torsion bar 629 based on the relative rotation between the second input shaft 8b and the output shaft 626, and to supply and discharge the hydraulic fluid to and from the first and second hydraulic chambers 62c and 62d. With this, the rotary valve 63 is configured to produce a pressure difference between the first and second hydraulic chambers 62c and 62d, and thereby to produce a thrust of the piston 62b, that is, the steering assist force.

Moreover, the first hollow motor 71A and the second hollow motor 71B drive and rotate the second input shaft 8b, so as to produce the thrust of the piston 62b, that is, the steering force (the steering assist force).

In this case, the DC/DC converters 78A and 78B are mounted to the outer circumference of the cylinder housing 621 so as to transmit the heat of the DC/DC converters 78A and 78B to the cylinder housing 621.

With this, the heat of the DC/DC converters 78A and 78B is absorbed by the thermal capacity of the cylinder housing 621. Accordingly, it is possible to suppress the temperature increase of the DC/DC converters 78A and 78B.

Moreover, in a case where the temperature of the hydraulic fluid of the hydraulic assist mechanism 6 is low, and the viscous drag is high, it is possible to decrease the viscous drag by transmitting the heat of the DC/DC converters 78A and 78B to the hydraulic fluid. Accordingly, it is possible to improve the operation efficiency of the power cylinder 62.

Besides, the both DC/DC converters 78A and 78B can be mounted on the outer circumference of the cylinder housing 621. Moreover, one of the DC/DC converters 78A and 78B whose the heating value is presumed to be greater can be mounted on the outer circumference of the cylinder housing 621.

Moreover, the DC/DC converters 78A and 78B are mounted to the cylinder housing 621 to shorten the wire between the controllers 72A and 72B and the DC/DC converters 78A and 78B. With this, it is possible to shorten a feed line in which the current after the voltage adjustment (after the voltage decrease) in the DC/DC converters 78A and 78B are large, and to suppress the heat generation in the feed line.

In the DC/DC converters 78A and 78B, the response delay of the output voltage is generated at the start/stop. Accordingly, the start/stop of the controllers 72A and 72B to which the electricity is supplied from the DC/DC converters 78A and 78B is delayed with respect to the start/stop of the DC/DC converters 78A and 78B.

Therefore, the controllers 72A and 72B are configured to set the start flag based on the output voltage of the DC/DC converters 78A and 78B.

Figure 21:
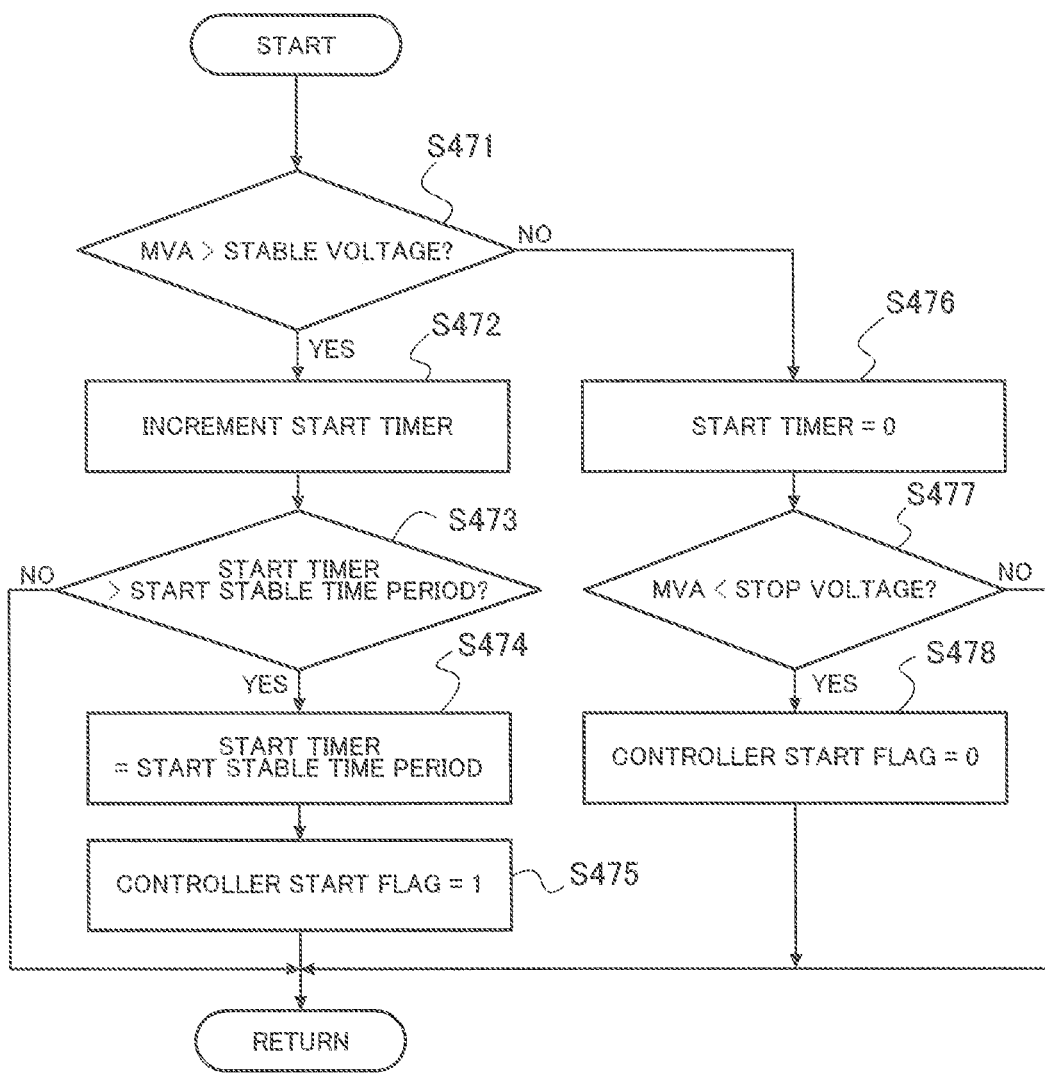
FIG. 21 is a flowchart showing a switching operation of a start flag of the redundant controller.

A flowchart of FIG. 21 shows a process of the setting operation of the start flag by the first controller 72A.

Besides, the second controller 72B is configured to perform the individual setting operation of the start flag in accordance with the process shown in the flowchart of FIG. 21, similarly to the first controller 72A. Accordingly, detailed explanations of the setting operation of the start flag by the second controller 72B are omitted.

At step 471, the first controller 72A is configured to compare the measurement value MVA of the output voltage of the first DC/DC converter 78A, and the voltage threshold value SV for the judgment of the stability of the voltage control operation of the first DC/DC converter 78A (0V<SV<the setting output voltage 12V).

In this case, when the measurement value MVA is greater than the voltage threshold value SV, the first controller 72A is configured to increment the value of the start timer at step S472 so as to measure, by the start timer, a duration of the state where the measurement value MVA is greater than the voltage threshold value SV.

Next, at step S473, the first controller 72A is configured to judge whether or not the value of the start timer is greater than a start stability time period after which it is estimated that the voltage control operation of the first DC/DC converter 78A is stabilized.

In this case, even when the measurement value MVA is greater than the voltage threshold value SV, the first controller 72A finishes the routine without setting the start flag when the above-described state does not continue during the start stability time period ST.

On the other hand, when the state in which the measurement value MVA is greater than the voltage threshold value SV exceeds the start stability time period ST, the first controller 72A is configured to set the start stability time period ST to the start timer at step S474, and to set 1 to the controller start flag at step S475.

Moreover, when the first controller 72A judges that the measurement value MVA is equal to or smaller than the voltage threshold value SV at step S471, the process proceeds to step S476. The start timer is reset to zero. At next step S477, the first controller 72A is configured to compare the measurement value MVA and a stop judgment voltage SDV.

The stop judgment voltage SDV is a voltage based on the lower limit value of the operable voltage of the first controller 72A. The stop judgment voltage SDV is set so as to estimate the stop of the first controller 72A (0V<SDV<SV<the set output voltage 12) when the measurement value MVA is smaller than the stop judgment voltage SDV.

At step S477, when the first controller 72A judges that the measurement value MVA is smaller than the stop judgment voltage SDV, the process proceeds to step S478. The first controller 72A is configured to set 0 to the controller start flag.

As described above, the controllers 72A and 72B are configured to set the start flag in accordance with the output voltage of the DC/DC converters 78A and 78B. Accordingly, for example, it is possible to improve the accuracy of the mutual judgment of the start/stop between the controllers 72A and 72B.

Figure 22:
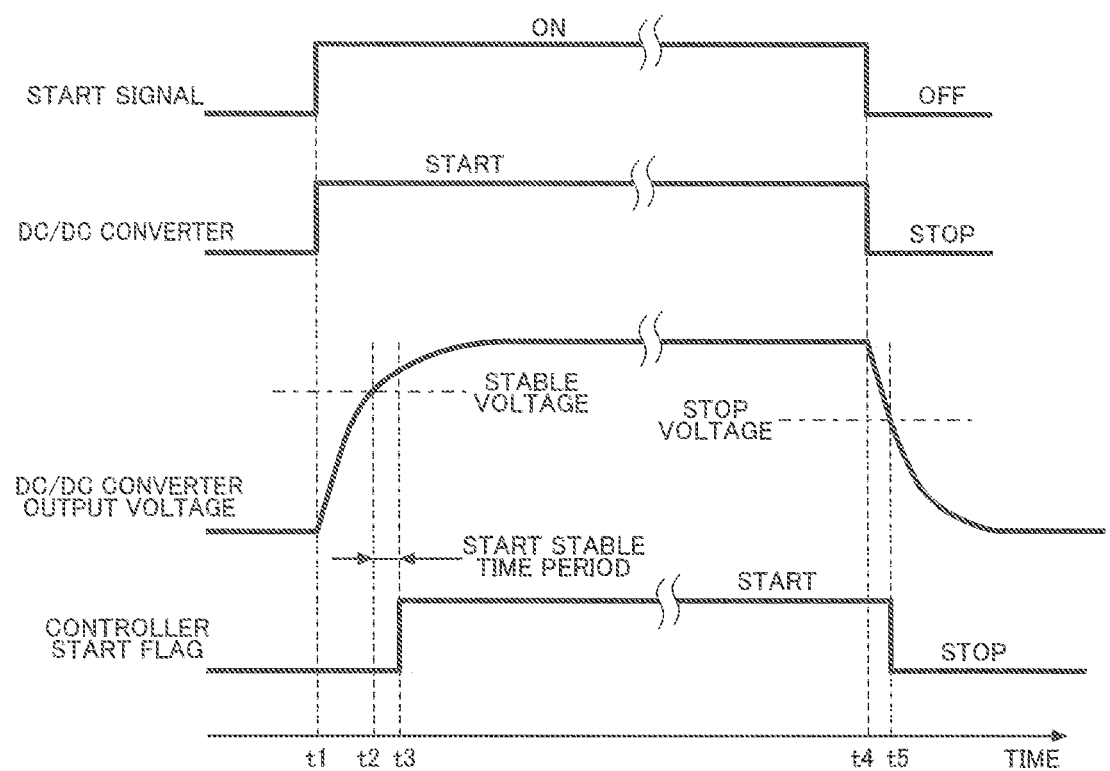
FIG. 22 is a time chart showing a switching timing of the start flag of the redundant controller.

A time chart of FIG. 22 shows a switching timing of the controller start flag when the controller start flag is set by the process shown in the flowchart of FIG. 21 by the first controller 72A.

At time t1, the start signal is risen. The first DC/DC converter 78A is started to be operated. The output voltage of the first DC/DC converter 78A is gradually increased.

At time t2, the output voltage of the first DC/DC converter 78A becomes greater than the voltage threshold value SV. At time t3, when the time reaches the start stability time period ST, the controller start flag is risen.

On the other hand, at time t4, the start signal is fallen, so that the first DC/DC converter 78A is stopped to be operated. The output voltage of the first DC/DC converter 78A is gradually decreased.

When the output voltage of the first DC/DC converter 78A becomes smaller than the stop judgment voltage SDV at time t5, the controller start flag is fallen.

The technical ideas explained in the embodiments can be used by the combinations as long as no inconsistency occurs.

Moreover, the concrete contents according to the present invention are explained with reference to the preferable embodiments. However, the persons skilled in the art can employ various variations based on the basic technical ideas and the teachings of the present invention.

For example, the vehicle-mounted device is not limited to the power steering device 2. The vehicle-mounted device may be, for example, the electric brake device.

Moreover, the vehicle-mounted device may be a vehicle-mounted device including, as the controller configured to control the motor including two sets of three phase wiring sets, the first controller (the first control circuit) configured to control the energization to the first wiring set (the first actuator), and the second controller (the second control circuit) configured to control the energization to the second wiring set (the second actuator).

Moreover, the actuator of the vehicle-mounted device is not limited to the motor. The actuator of the vehicle-mounted device may be an electric cylinder.

Moreover, the communication between the controllers 72A and 72B is not limited to the inter-microcomputer communication. For example, the communication between the controllers 72A and 72B may be a communication through a vehicle-mounted network such as CAN (Controller Area Network).

Moreover, the two control circuits (two controllers) of the redundant system may be mounted on one circuit board, and may be mounted on different circuit boards.

Besides, the present invention is not limited to the above-described embodiments. The present invention includes various variations. For example, the above-described embodiments are explained in detail to explain to be easy to understand. Accordingly, the present invention is not limited to the configuration including all explained structures. Moreover, a part of the configuration of one embodiment can be replaced by the configuration of the other embodiment. Furthermore, the configuration of the other configuration of the other embodiment is added to the configuration of one embodiment. Moreover, the other configuration may be added, deleted, and replaced to and from a part of the configuration of each of the embodiments.

This application is based on a prior Japanese Patent Application No. 2018-54419. The entire contents of the prior Japanese Patent Application No. 2018-54419 including the specification, the claims, the drawings, and the specification are hereby incorporated by reference.

EXPLANATION OF SYMBOLS

1 . . . vehicle, 2 . . . power steering device (vehicle-mounted device), 7A . . . first electric assist mechanism, 7B . . . second electric assist mechanism, 71A . . . first hollow motor (first actuator), 71B . . . second hollow motor (second actuator), 72A . . . first controller (first control circuit), 72B . . . second controller (second control circuit), 76A . . . first power source (first electric power supply circuit), 76B . . . second power source (second electric power supply circuit, 78A . . . first DC/DC converter (first voltage conversion device), and 78B . . . second DC/DC converter (second voltage conversion circuit)

The invention claimed is:
1. A vehicle-mounted apparatus comprising:
a first voltage conversion circuit configured to convert a voltage of an electric power supplied from a first electric power supply circuit, to a first predetermined voltage;
a first control circuit configured to be operated by the electric power of the first predetermined voltage supplied from the first voltage conversion circuit, and to output a first actuator command signal;
a first actuator configured to be actuated based on the first actuator command signal;

a second voltage conversion circuit configured to convert a voltage of an electric power supplied from a second electric power supply circuit, to a second predetermined voltage;

a second control circuit configured to be operated by the electric power of the second predetermined voltage supplied from the second voltage conversion circuit, and to output a second actuator command signal;

a second actuator configured to be actuated based on the second actuator command signal; and a power cylinder including a housing and a piston, wherein:

the housing includes a first chamber and a second chamber separated by the piston;

the piston is configured to obtain a thrust by a pressure difference between hydraulic fluids supplied, respectively, to the first chamber and the second chamber;

the first voltage conversion circuit and the second voltage conversion circuit are configured to transmit a heating value by heat generation, to the housing;

the first actuator is a first electric motor configured to provide the thrust to the piston; and the second actuator is a second electric motor configured to provide the thrust to the piston.

2. The vehicle-mounted apparatus as claimed in claim 1, wherein the first voltage conversion circuit is configured to output, to the first control circuit, a first control circuit start signal to start the first control circuit in accordance with an obtainment of a start signal of the vehicle; and the second voltage conversion circuit is configured to output, to the second control circuit, a second control circuit start signal to start the second control circuit in accordance with an obtainment of the start signal of the vehicle.

3. The vehicle-mounted apparatus as claimed in claim 1, wherein the first control circuit includes a second control circuit voltage monitoring section configured to monitor the voltage of the electric power supplied to the second control circuit; and the second control circuit includes a first control circuit voltage monitoring section configured to monitor the voltage of the electric power supplied to the first control circuit.

4. The vehicle-mounted apparatus as claimed in claim 3, wherein the first control circuit includes a first inter-microcomputer communication section configured to perform an intercommunication with the second control circuit;

the second control circuit voltage monitoring section is configured to monitor the voltage of the electric power supplied to the second control circuit through the first inter-microcomputer communication section;

the second control circuit includes a second inter-microcomputer communication section configured to perform an intercommunication with the first control circuit; and the first control circuit voltage monitoring section is configured to monitor the voltage of the electric power supplied to the second control circuit through the second inter-microcomputer communication section.

5. The vehicle-mounted apparatus as claimed in claim 1, wherein the first control circuit is configured to output the first actuator command signal which is an output higher than an output of the second actuator command signal when the voltage of the electric power supplied to the second control circuit is lower than the voltage of the electric power supplied to the first control circuit; and the second control circuit is configured to output the second actuator command signal which is an output higher than an output of the first actuator command signal when the voltage of the electric power supplied to the first control circuit is lower than the voltage of the electric power supplied to the second control circuit.

6. The vehicle-mounted apparatus as claimed in claim 3, wherein the first electric power supply circuit is configured to supply an electric power supplied from a battery to the first voltage conversion circuit;

the second electric power supply circuit is configured to supply the electric power supplied from the battery to the second voltage conversion circuit;

the first control circuit includes a first abnormality record storing section;

the first abnormality record storing section is configured to store information relating to an abnormality of the second voltage conversion circuit when the second control circuit voltage monitoring section judges that the voltage of the electric power supplied to the second control circuit is lower than the voltage of the electric power supplied to the first control circuit;

the second control circuit includes a second abnormality record storing section; and the second abnormality record storing section is configured to store information relating to an abnormality of the first voltage conversion circuit when the first control circuit voltage monitoring section judges that the voltage of the electric power supplied to the first control circuit is lower than the voltage of the electric power supplied to the second control circuit.

7. The vehicle-mounted apparatus as claimed in claim 3, wherein the first control circuit includes a second actuator current monitoring section configured to monitor a current flowing in the second actuator;

the first control circuit is configured to adjust the first actuator command signal based on the current and the voltage of the electric power supplied to the first actuator, and the current and the voltage of the electric power supplied to the second actuator;

the second control circuit includes a first actuator current monitoring section configured to monitor a current flowing in the first actuator; and the second control circuit is configured to adjust the second actuator command signal based on the current and the voltage of the electric power supplied to the second actuator, and the current and the voltage of the electric power supplied to the first actuator.

8. The vehicle-mounted apparatus as claimed in claim 1, wherein the first control circuit is configured to obtain the electric power supplied from the second voltage conversion circuit; and the second control circuit is configured to obtain the electric power supplied from the first voltage conversion circuit.

* * * * *